(12) United States Patent
Park et al.

(10) Patent No.: US 11,778,616 B2
(45) Date of Patent: Oct. 3, 2023

(54) METHOD AND APPARATUS FOR TRANSMITTING AND RECEIVING SIDELINK HARQ FEEDBACK INFORMATION

(71) Applicant: KT CORPORATION, Gyeonggi-do (KR)

(72) Inventors: Ki-Hyeon Park, Seoul (KR); Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 239 days.

(21) Appl. No.: 16/862,828

(22) Filed: Apr. 30, 2020

(65) Prior Publication Data
US 2020/0351866 A1   Nov. 5, 2020

(30) Foreign Application Priority Data

Apr. 30, 2019  (KR) .................. 10-2019-0050243
Mar. 13, 2020  (KR) .................. 10-2020-0031492

(51) Int. Cl.
*H04L 1/1812* (2023.01)
*H04W 72/21* (2023.01)

(52) U.S. Cl.
CPC ........... *H04W 72/21* (2023.01); *H04L 1/1812* (2013.01)

(58) Field of Classification Search
CPC combination set(s) only.
See application file for complete search history.

(56) References Cited

U.S. PATENT DOCUMENTS

| 10,993,141 | B2 * | 4/2021 | Huang | H04W 72/1263 |
|---|---|---|---|---|
| 2019/0200378 | A1 * | 6/2019 | Ko | H04W 72/042 |
| 2019/0239118 | A1 * | 8/2019 | Baghel | H04L 5/0053 |
| 2020/0059940 | A1 * | 2/2020 | Wang | H04L 5/0055 |
| 2020/0099476 | A1 * | 3/2020 | Park | H04W 4/70 |
| 2020/0099479 | A1 * | 3/2020 | Park | H04W 4/70 |
| 2020/0228247 | A1 * | 7/2020 | Guo | H04L 1/1812 |
| 2020/0280398 | A1 * | 9/2020 | Hwang | H04W 4/40 |
| 2020/0288286 | A1 * | 9/2020 | Hwang | H04L 1/1854 |
| 2021/0099994 | A1 * | 4/2021 | Park | H04L 1/1861 |
| 2021/0105789 | A1 * | 4/2021 | Freda | H04W 4/40 |
| 2022/0085923 | A1 * | 3/2022 | Ye | H04L 1/1825 |
| 2022/0256504 | A1 * | 8/2022 | Lin | H04L 1/1864 |

* cited by examiner

*Primary Examiner* — Hanh N Nguyen
(74) *Attorney, Agent, or Firm* — INVENSTONE Patent, LLC

(57) ABSTRACT

Provided are methods and apparatuses for transmitting HARQ feedback information for sidelink transmission. In particular, a method of a transmitting user equipment (UE) is provided for transmitting the HARQ feedback information for the sidelink transmission. The method may include: receiving, from the base station, resource assignment information on a physical uplink control channel (PUCCH) for transmitting, to the base station, the HARQ feedback information for the sidelink transmission to a receiving UE; generating the HARQ feedback information based on a physical sidelink feedback channel (PSFCH) for the sidelink transmission received from the receiving UE; and transmitting the HARQ feedback information over the PUCCH based on the resource assignment information to the base station.

8 Claims, 21 Drawing Sheets

METHOD AND APPARATUS FOR TRANSMITTING AND RECEIVING SIDELINK HARQ FEEDBACK INFORMATION

CROSS-REFERENCE TO RELATED APPLICATION

This application claims the priority benefit of Korean Patent Application No. 10-2019-0050243, filed on Apr. 30, 2019 and No. 10-2020-0031492, filed on Mar. 13, 2020 in the Korean Intellectual Property Office, the disclosures of which are incorporated herein by reference in their entirety.

BACKGROUND

1. Technical Field

The present disclosure relates to methods and apparatuses for transmitting and receiving sidelink HARQ feedback information in a next-generation/5G radio access network (hereinafter, referred to as a new radio, "NR").

2. Description of the Related Art

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from each other (e.g., subcarrier spacing, subframe, Transmission Time Interval (TTI), etc.) as a method for efficiently satisfying each usage scenario requirement through a frequency band constituting any NR system.

To address such issues, a design is needed for transmitting HARQ ACK/NACK feedback information to a base station for device-to-device radio link transmission for providing a V2X service in the NR, that is, NR sidelink transmission.

SUMMARY

In accordance with embodiments of the present disclosure, methods and apparatuses are provided for generating a signal transmitted through Physical Sidelink Feedback Channel (PSFCH) for transmitting HARQ feedback information for sidelink transmission to a base station, in the NR.

In accordance with one aspect of the present disclosure, a method of a transmitting user equipment is provided for transmitting HARQ feedback information for sidelink transmission to a base station. The method may include: receiving, from the base station, resource assignment information on a physical uplink control channel (PUCCH) for transmitting, to the base station, the HARQ feedback information for the sidelink transmission to a receiving user equipment; generating the HARQ feedback information based on a physical sidelink feedback channel (PSFCH) for the sidelink transmission received from the receiving user equipment; and transmitting the HARQ feedback information over the PUCCH based on the resource assignment information to the base station.

In accordance with another aspect of the present disclosure, a method of a base station is provided for receiving HARQ feedback information for sidelink transmission from a transmitting user equipment. The method may include: transmitting, to the transmitting user equipment, resource assignment information on a physical uplink control channel (PUCCH) for transmitting, to the base station, the HARQ feedback information for the sidelink transmission to a receiving user equipment; and receiving, over the PUCCH, the HARQ feedback information generated in the transmitting user equipment based on a physical sidelink feedback channel (PSFCH) transmitted from the receiving user equipment.

In accordance with further another aspect of the present disclosure, a transmitting user equipment is provided for transmitting HARQ feedback information for sidelink transmission to a base station. The transmitting user equipment may include: a receiver receiving, from the base station, resource assignment information on a physical uplink control channel (PUCCH) for transmitting, to the base station, the HARQ feedback information for the sidelink transmission to a receiving user equipment; a controller generating the HARQ feedback information based on a physical sidelink feedback channel (PSFCH) for the sidelink transmission received from the receiving user equipment; and a transmitter transmitting the HARQ feedback information over the PUCCH based on the resource assignment information to the base station.

In accordance with yet another aspect of the present disclosure, a base station is provided for receiving HARQ feedback information for sidelink transmission from a transmitting user equipment. The base station may include: a transmitter transmitting, to the transmitting user equipment, resource assignment information on a physical uplink control channel (PUCCH) for transmitting, to the base station, the HARQ feedback information for the sidelink transmission to a receiving user equipment; and a receiver receiving, over the PUCCH, the HARQ feedback information generated in the transmitting user equipment based on a physical sidelink feedback channel (PSFCH) transmitted from the receiving user equipment.

In accordance with yet another aspect of the present disclosure, a method of a base station is provided for receiving HARQ feedback information for sidelink transmission from a transmitting user equipment, The method may include: transmitting configuration information on a resource pool for the sidelink transmission, and receiving, through the physical uplink control channel (PUCCH) from the UE, the HARQ feedback information in response to a physical sidelink shared channel (PSSCH) received from other UE over a physical sidelink feedback channel (PSFCH) within the resource pool wherein the HARQ feedback information is generated based on a sequence associated with the resource pool.

In accordance with embodiments of the present disclosure, it is possible to provide methods and apparatuses for generating a signal transmitted through Physical Sidelink Feedback Channel (PSFCH) for transmitting HARQ feedback information for sidelink transmission to a base station, in the NR.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
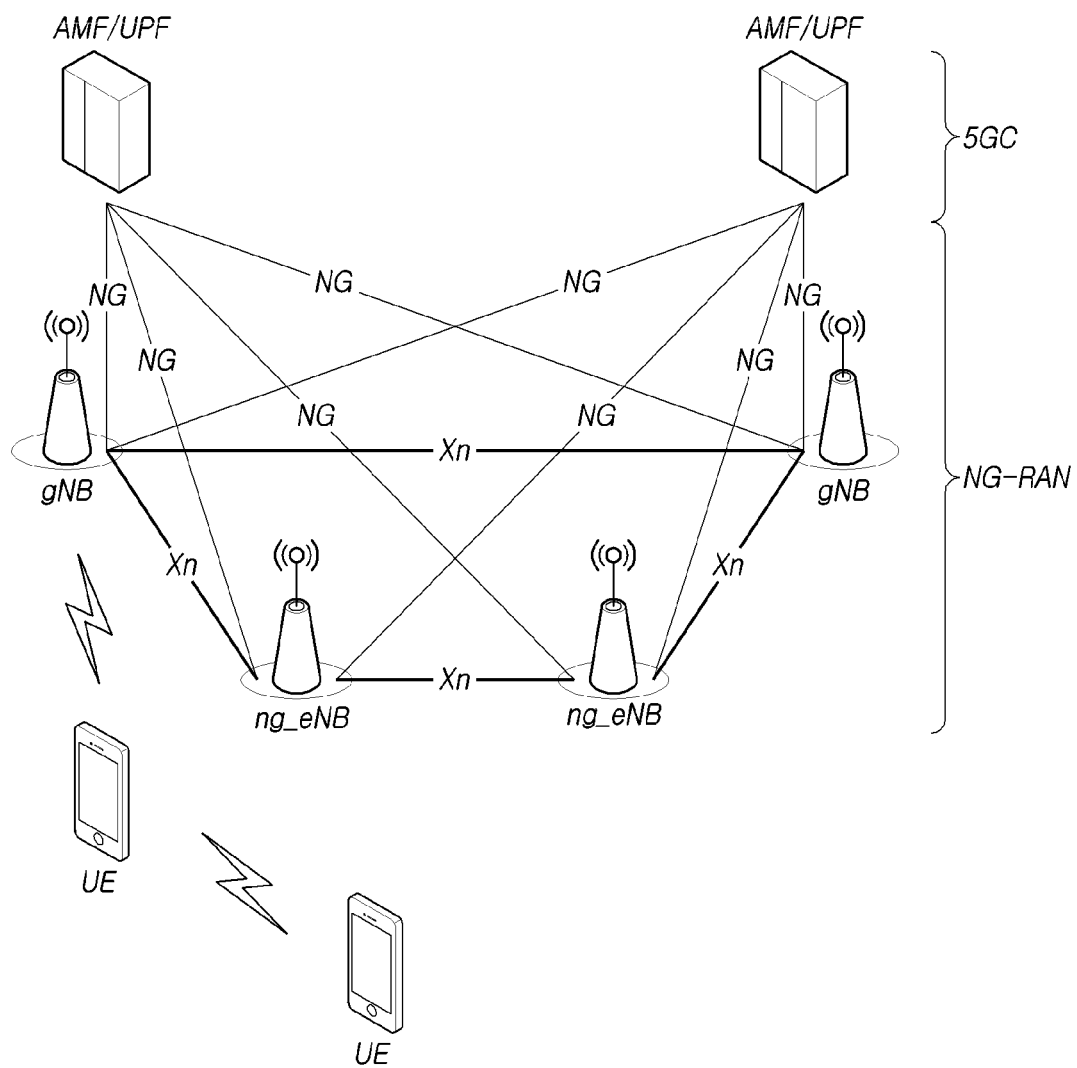
FIG. 1 schematically illustrates an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as $3^{rd}$ generation partnership project (3GPP), 3GPP2, WiFi, Bluetooth, institute of electrical and electronics engineers (IEEE), international telecommunication union (ITU), or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized. Further, the embodiments may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or the UE may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself An uplink (UL) refers to data transmission and reception from a UE to a base station, and a downlink (DL) refers to data transmission and reception from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a cyclic prefix (CP)-OFDM waveform using a cyclic prefix for downlink transmission and uses CP-OFDM or discrete Fourier transform spread (DFT-s)-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
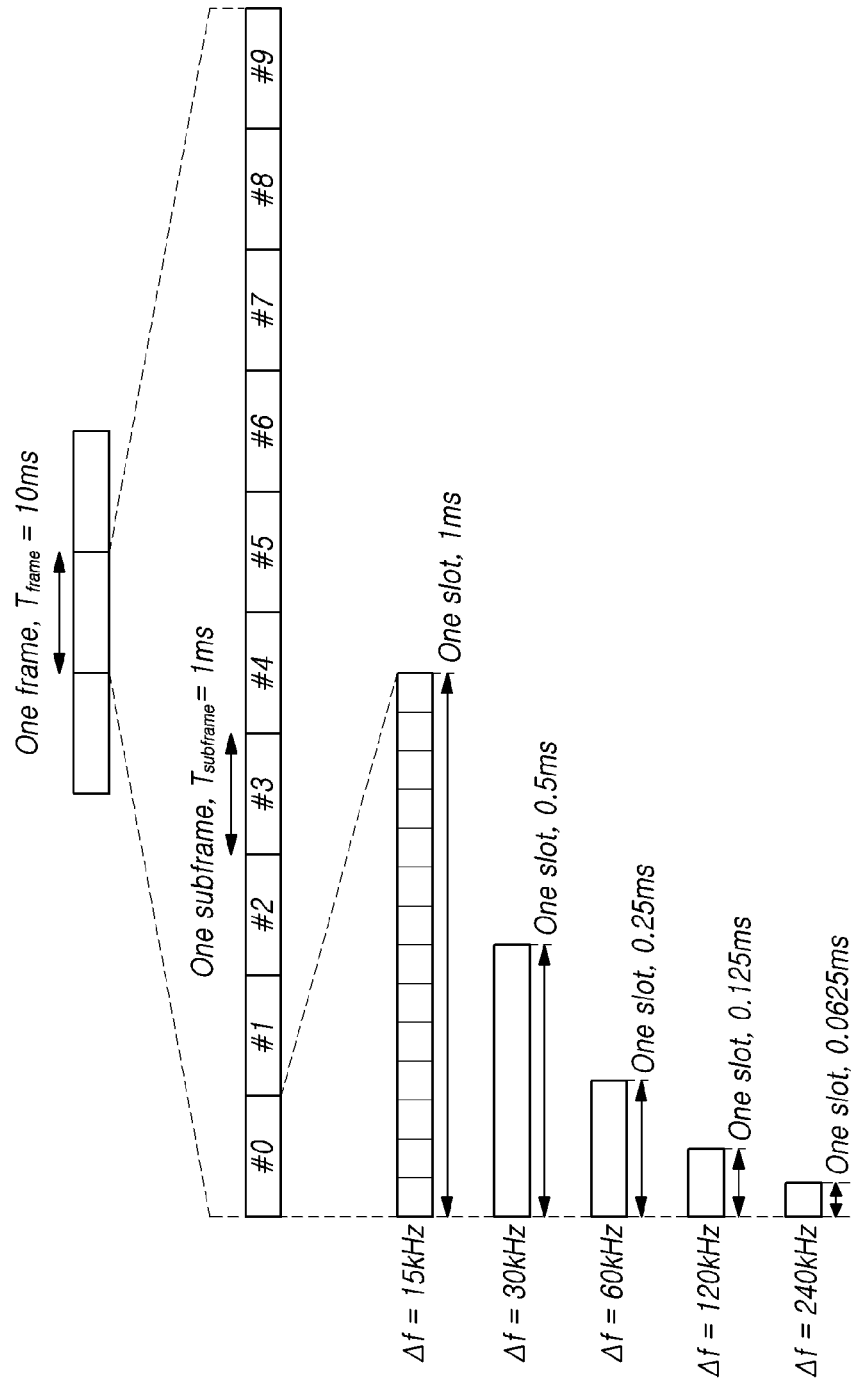
FIG. 2 schematically illustrates a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. In NR, a frame is defined to 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource assignment as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct (e.g., inform or direct) the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
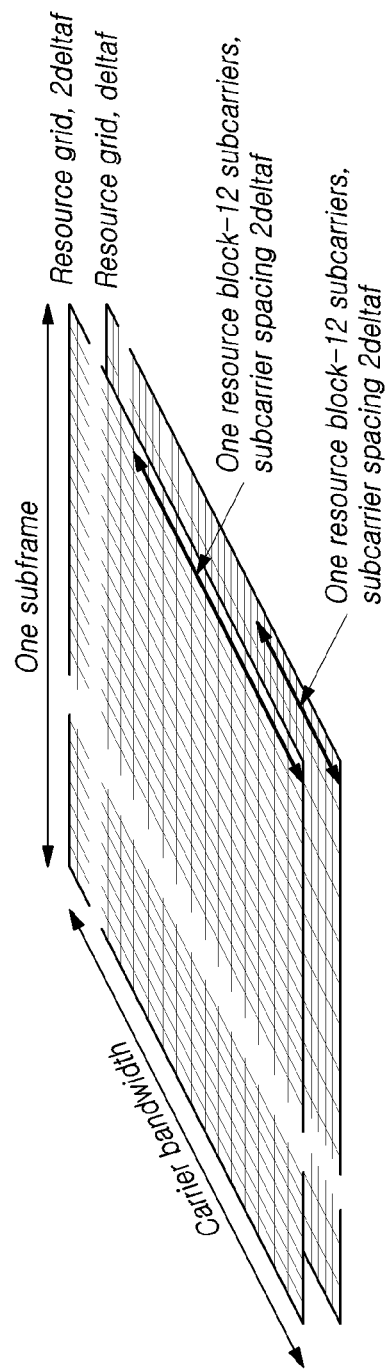
FIG. 3 illustrates resource grids supported by a radio access technology in accordance with embodiments of the present disclosure.

FIG. 3 illustrates resource grids supported by a radio access technology in accordance with embodiments of the present disclosure;

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
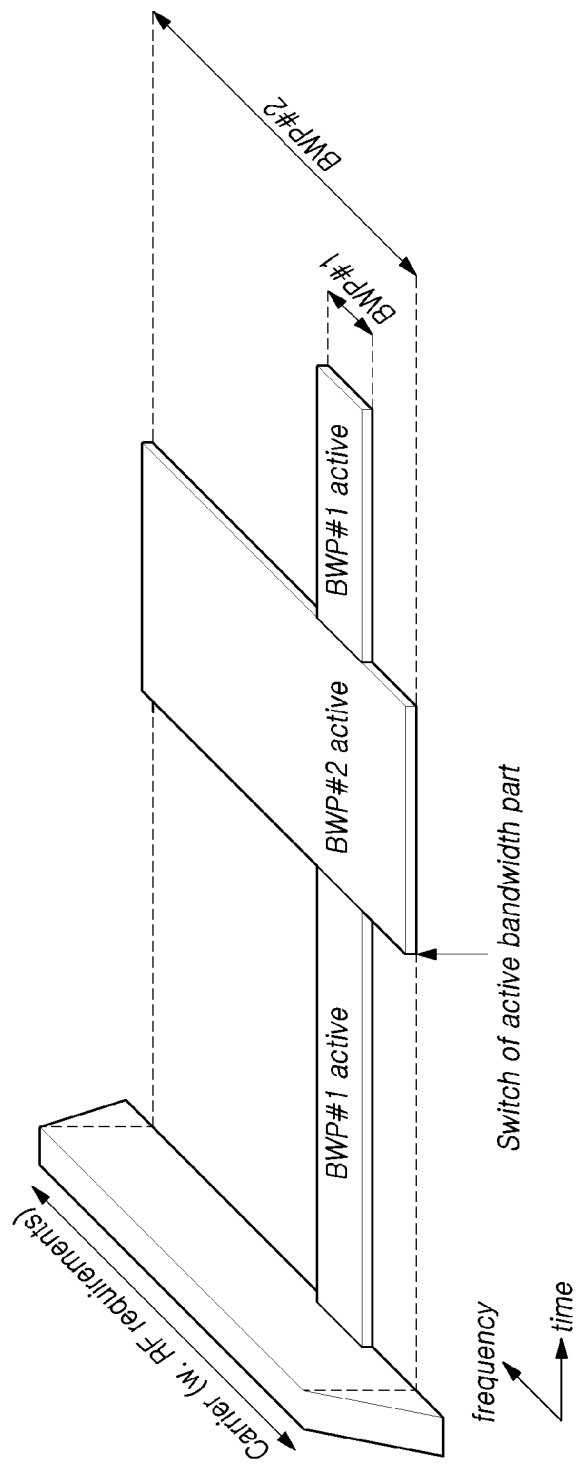
FIG. 4 illustrates bandwidth parts supported by a radio access technology in accordance with embodiments of the present disclosure.

FIG. 4 illustrates bandwidth parts supported by a radio access technology in accordance with embodiments of the present disclosure;

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
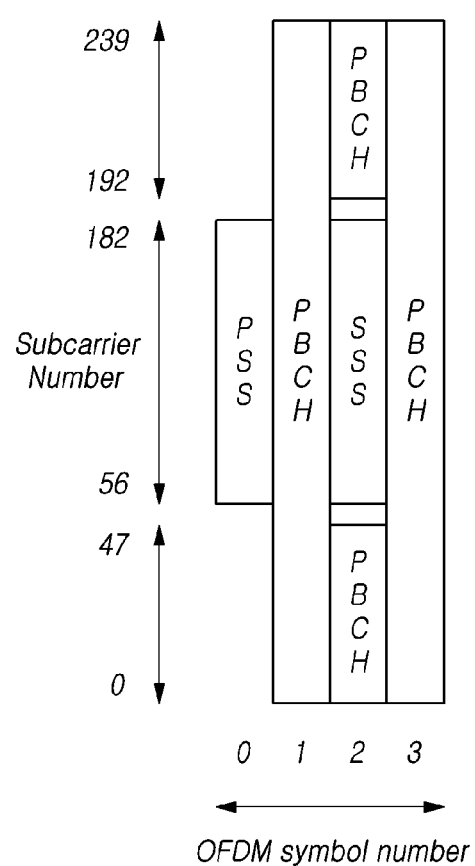
FIG. 5 illustrates an example of a synchronization signal block in a radio access technology in accordance with embodiments of the present disclosure.

FIG. 5 illustrates an example of a synchronization signal block in a radio access technology in accordance with embodiments of the present disclosure;

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
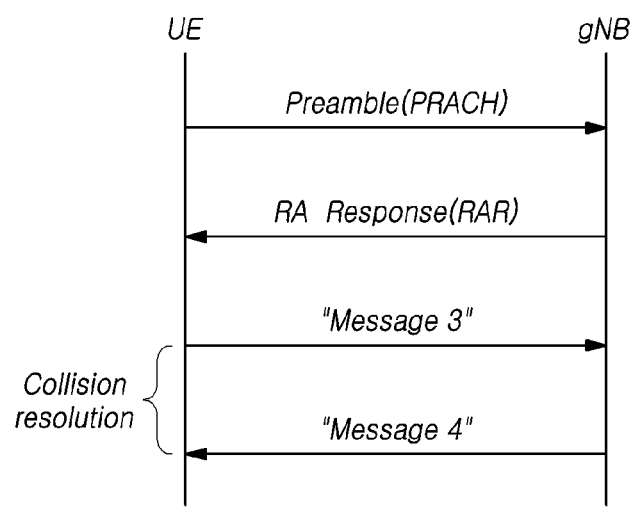
FIG. 6 is a signal diagram for explaining a random access procedure in a radio access technology in accordance with embodiments of the present disclosure.

FIG. 6 is a view for explaining a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
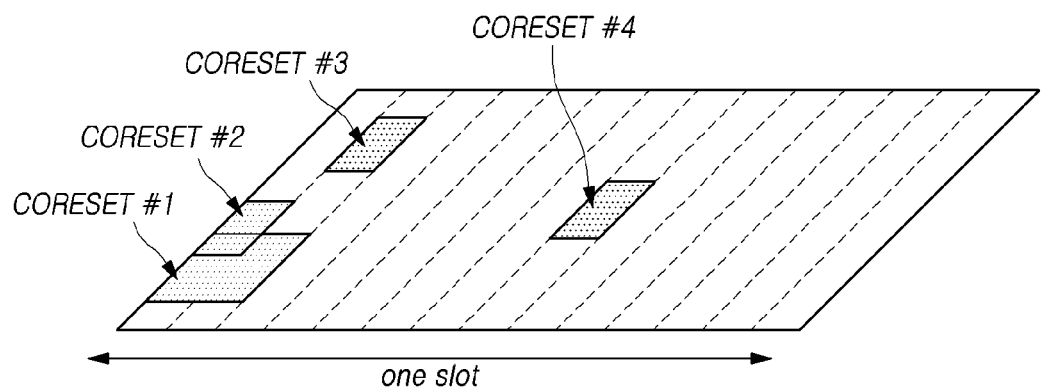
FIG. 7 illustrates CORESET.

FIG. 7 illustrates CORESET;

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

<LTE Sidelink>

In the LTE system, for providing device-to-device communication and vehicle-to-everything (V2X) (in particular, vehicle-to-vehicle (V2V)) service, designs for a radio channel and a radio protocol for direct communication (i.e. sidelink) between devices have been developed.

With respect to the sidelink, a synchronization signal (PSSS/SSSS) for synchronizing between a radio sidelink transmission end and a radio sidelink reception end, and a physical sidelink broadcasting channel (PSBCH) for transmitting/receiving a sidelink master information block (MIB) related to this have been defined. Further, designs have been conducted on a physical sidelink discovery channel (PSDCH) for transmitting/receiving discovery information, a physical sidelink control channel (PSCCH) for transmitting/receiving sidelink control information (SCI), and a physical sidelink shared channel (PSSCH) for transmitting/receiving sidelink data.

In order to assign a radio resource for the sidelink, two modes have been developed, i.e. i) mode 1 in which a base station assigns a radio resource and ii) mode 2 in which a UE selects and assigns a radio resource from a radio resource pool. Further, in order to satisfy the V2X scenario in the LTE system, a related technology has been required to be developed additionally.

In such an environment, the 3GPP have introduced 27 service scenarios related to vehicle recognition/detection in Rel-14, and determined key performance requirements according to road conditions. In addition, the 3GPP have introduced 25 service scenarios, such as vehicle platooning, advanced driving, remote driving, an extended sensor, or the like, evolved from Rel-14, and determined 6 performance requirements in Rel-15.

In order to satisfy such performance requirements, developments have been conducted for improving the performance of the sidelink technology developed based on the typical D2D communication to meet requirements of the V2X. In particular, in order to apply to the C-V2X (Cellular-V2X), a technology for improving a design of the physical layer of the sidelink to be adapted to a high-speed environment, a resource assignment technology, a synchronization technology may be selected as further study items.

The sidelink described below means a link used in D2D communication after Rel-12 of the 3GPP and V2X communication after Rel-14, and the terms for each channel, synchronization signal, and resource are described using equal terms without differently being defined according to requirements of the D2D communication, requirements of the V2X communication in Rel-14 and Rel-15. This is for convenience of description and ease of understanding, and when needed, embodiments will be described by focusing on a difference of the sidelink satisfying V2X scenario requirements relative to the sidelink for the D2D communication in Rel-12/13. Accordingly, the terms related to the sidelink discussed below are classified into D2D communication, V2X communication, and C-V2X communication for merely comparison between them and ease of understanding; therefore, such terms are not limited to a specific scenario.

<Resource Assignment>

Figure 8:
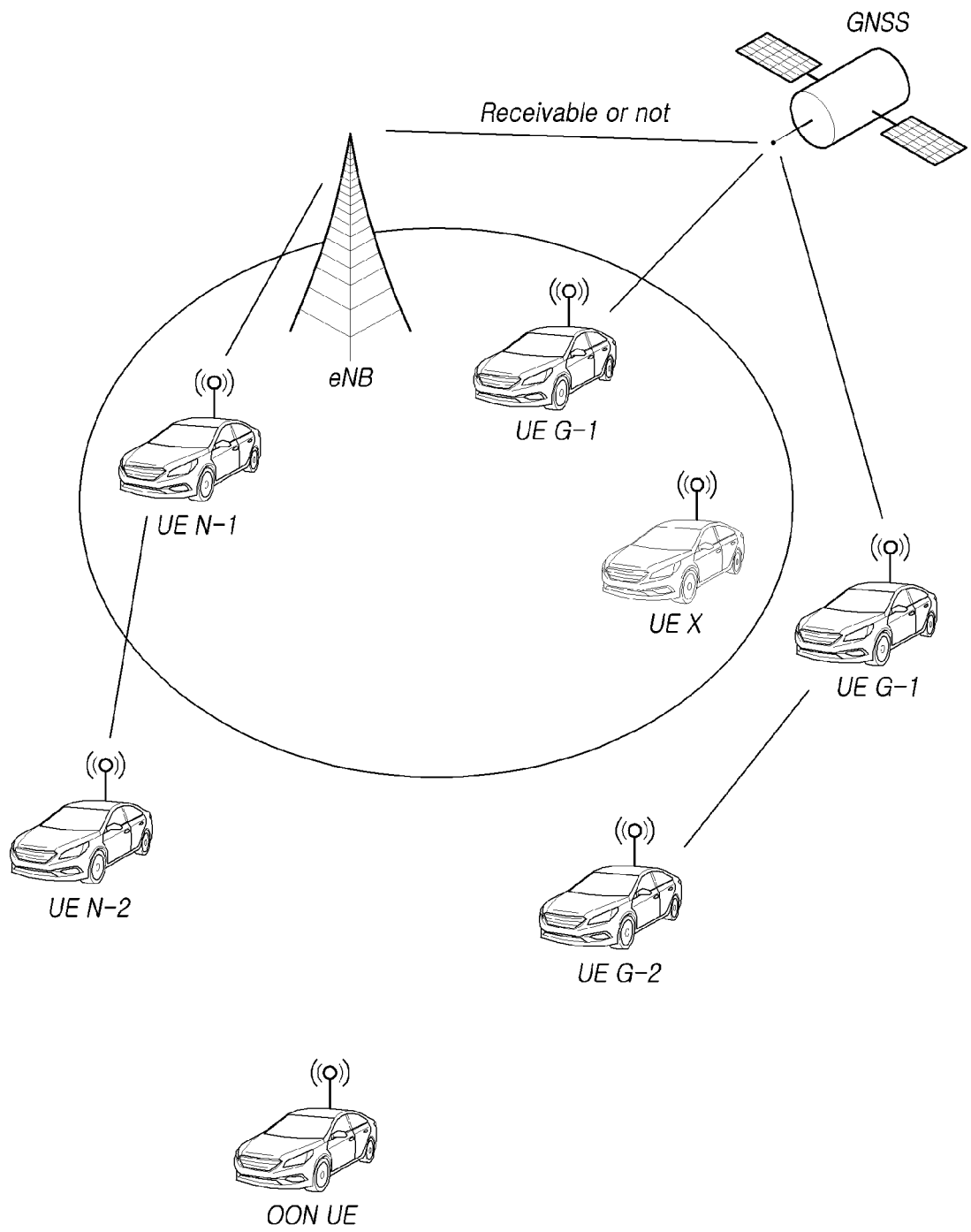
FIG. 8 illustrates various scenarios for V2X communication.

FIG. 8 illustrates various scenarios for V2X communication;

Referring to FIG. 8, a V2X device (represents a vehicle; however, may be replaced with other devices, such as a user equipment (UE), etc.) may be located in coverage of a base station (e.g., an eNB, a gNB, or an ng-eNB), or located outside of coverage of the base station. For example, communication may be performed between UEs (e.g., UE N-1, UE G-1, UE X) in coverage of the base station, or communication may be performed between a UE in coverage of the base station and a UE (e.g., UE N-1, UE N-2) outside of coverage of the base station. Alternatively, communication may be performed between UEs (e.g., UE G-1, UE G-2) out of coverage of the base station.

In such various scenarios, it is necessary to assign a radio resource for enabling a corresponding UE to perform communication using the sidelink. The assignment of the radio resource includes a method of a base station for handling the assignment of the radio resource and a method of a UE on its own selects and assigns the radio resource.

Specifically, in the D2D, for enabling a UE to assign a resource, two modes are defined, that is, i) a centralized mode (mode 1) in which a base station intervenes in the selection and management of the resource, and ii) a distributed mode (mode 2) in which a UE selects randomly one or more of pre-configured resources. Similar to the D2D, other modes are defined, such as, iii) a third mode (mode 3) in which a base station intervenes in the selection and management of the resource in the C-V2X, and iv) a fourth mode (mode 4) in which a vehicle directly selects a resource in the V2X. In the third mode (mode 3), a base station provides a schedule of a scheduling assignment (SA) pool resource area and a data pool resource area assigned to this to a transmitting UE.

Figure 9A:
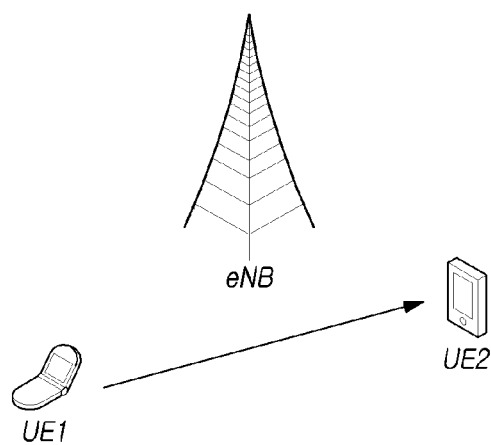
FIG. 9A illustrates a first user equipment (UE1) and a second user equipment (UE2) performing sidelink communication.
Figure 9B:
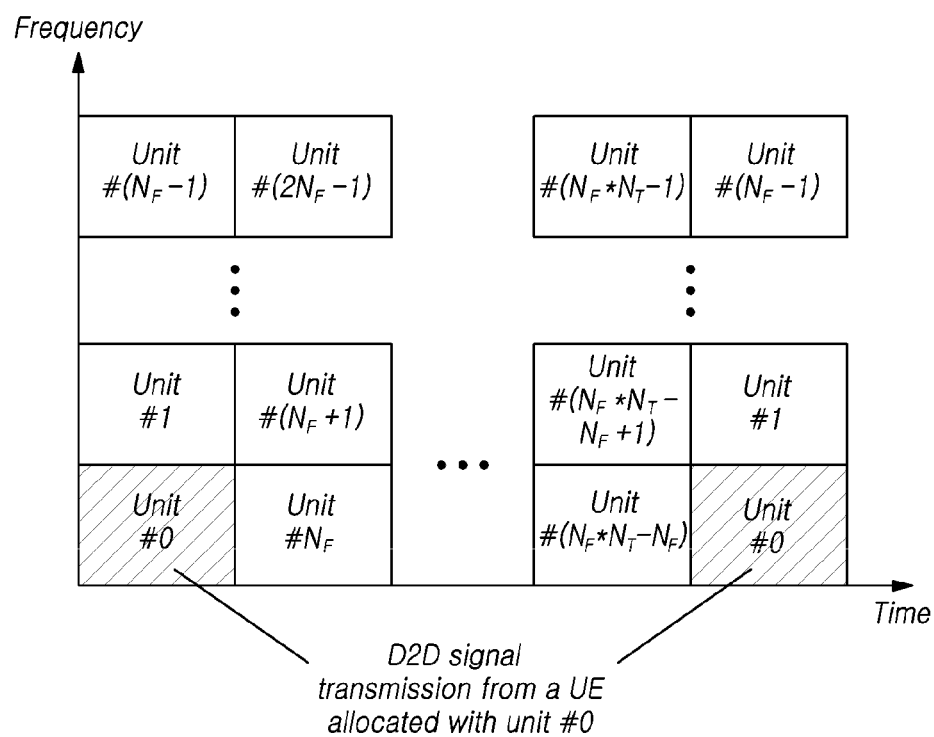
FIG. 9B illustrates an example of resource pools for user equipments.

FIG. 9A illustrates a first user equipment (UE1) and a second user equipment (UE2) performing sidelink communication, and FIG. 9B illustrates an example of resource pools used by the UEs.

Referring to FIG. 9, an eNB represents a base station; however, the embodiments are not limited thereto. For example, the base station may be a gNB or an ng-eNB. Further, the UEs represent mobile terminals; however, the embodiments are not limited thereto. For example, the UEs may represent vehicles, infrastructures, or the like depending on scenarios or situations.

In FIG. 9A, the transmitting UE (UE 1) may select a resource unit corresponding to a specific resource within a resource pool including a set of resources, and transmit a sidelink signal using the resource unit. The receiving UE (UE 2) may be configured with a resource pool over which the UE 1 is allowed to transmit a signal and detect a transmission signal from the UE 1.

If the UE 1 is in coverage of the base station, that is, available to receive services or signals from the base station, the base station may provide the resource pool to the UE 1. If the UE 1 is out of coverage of the base station, that is, unavailable to receive services or signals from the base station, the resource pool may be determined as one or more resources which are pre-configured or provided by another UE. Normally, the resource pool is made up of a plurality of resource units, and each UE may select one or more resource units and use the selected resource unit(s) for transmitting a sidelink signal.

Referring to FIG. 9B, the entire frequency resource is divided into NF frequency resources, and the entire time resource is divided into NT time resources. Thus, a total of NF*NT resource units may be defined. In this case, it is possible to express that a corresponding resource pool is repeated at a period of NT subframes. In particular, one resource unit may be configured to be provided periodically and repeatedly, as illustrated in FIG. 9B.

The resource pool may be classified into several types according to a certain criterion. For example, the resource pool may be classified into several types according to contents of a sidelink signal transmitted over each resource pool. As one example, the contents of the sidelink signal may be classified, and a separate resource pool may be configured for each of the contents. Scheduling assignment (SA), a sidelink channel, a discovery channel, or the like may be examples of the contents of the sidelink signal.

The SA may be a signal including information, such as, a location of a resource used to transmit a subsequent sidelink data channel by a transmitting UE, a modulation and coding scheme (MCS) that is needed to demodulate a data channel, a MIMO transmission scheme, timing advance (TA), or the like. This signal may be transmitted by being multiplexed with sidelink data over an identical resource unit as well. In this case, the SA resource pool may mean a pool of resources over which the SA is transmitted by being multiplexed with the sidelink data.

An FDM scheme applied to the V2X communication may cause a time delay until a data resource is assigned after a SA resource has been assigned to be reduced. For example, it is possible to consider a non-adjacent scheme in which a control channel resource and a data channel resource are split in time domain in one subframe, an adjacent scheme in which a control channel and a data channel are consecutively assigned in one subframe, or the like.

When the sidelink data along with the SA are multiplexed and transmitted over an identical resource unit, a sidelink data channel only in a different form from SA information may be transmitted over a resource pool for the sidelink data channel. In other words, resource elements used to transmit SA information over one or more individual resource units within a SA resource pool may be used still for transmitting sidelink data in a sidelink data channel resource pool. The discovery channel may be a resource pool for a message for enabling a transmitting UE to transmit information, such as an ID of the transmitting UE, or the like, and a neighboring UE to discover the transmitting UE. Even when contents of the sidelink signal are equal, different resource pools may be used according to transmission and/or reception characteristics of the sidelink signal.

For example, in even the case of an identical sidelink data channel or a discovery message, a different resource pool may be used according to a method of determining a transmission timing of a sidelink signal (e.g., whether the sidelink signal is transmitted at the time of receiving a synchronization reference signal or transmitted by applying a certain TA from the time of receiving the synchronization reference signal) or a method of assigning a resource (e.g., whether a base station dedicates a resource for transmitting a signal to a transmitting UE or whether a transmitting UE on its own selects a resource for transmitting a signal in a pool), a signal format (e.g., the number of symbols occupied by each sidelink signal in one subframe, the number of subframes used for transmitting one sidelink signal), a signal strength of from a base station, a transmission power strength of a sidelink UE, or the like.

<Synchronization Signal>

As described above, a V2X communication UE may be located out of coverage of a base station. In even this situation, it is necessary for performing communication using the sidelink. To do this, it is important for a UE located out of coverage of the base station to achieve synchronization.

Hereinafter, a method of achieving time and frequency synchronization in sidelink communication, particularly in communication between vehicles, between a vehicle and a UE, or between a vehicle and a communication network will be described based on the description above.

The D2D communication utilizes a sidelink synchronization signal (SLSS), which is a synchronization signal transmitted from a base station for time synchronization between UEs. In the C-V2X, a satellite system (e.g., the Global Navigation Satellite System (GNSS)) may be additionally considered for enhancing synchronization performance. In this case, priority may be given to synchronization establishment or a base station may indicate information on priority. For example, when determining its transmission synchronization, a UE selects a synchronization signal directly transmitted from a base station as a highest priority, and, when the UE is out of coverage of the base station, synchronizes with the SLSS transmitted from another UE in coverage of the base station as a higher priority.

Since a wireless terminal (hereinafter, for convenience of description, may be referred to as the UE as well) installed in a vehicle, or a UE mounted in the vehicle has a less problem with battery consumption and can use a satellite signal such as the GPS for navigation purposes, the satellite signal may be used for configuring time or frequency synchronization between UEs. The satellite signal may include, as well as the Global Positioning System (GPS), the GLObal NAvigation Satellite System (GLONAS), GALILEO, BEIDOU, or the like.

The sidelink synchronization signal may include a primary sidelink synchronization signal (PSSS), a secondary sidelink synchronization signal (SSSS), or the like. The PSSS may include a Zadoff-chu sequence with a pre-configured length, a structure similar to the PSS, a structure changed from the PSS, or a structure in which the PSS is repeated. Unlike a DL PSS, a different Zadoff-chu root index (e.g. 26, 37) may be used. The SSSS may include an M-sequence, a structure similar to the SSS, a structure changed from the SSS, or a structure in which the SSS is repeated. In a situation where UEs synchronize with a base station, the SRN is served as the base station, and the SLSS is served as the PSS or the SSS.

Unlike the PSS/SSS of DL, the PSSS/SSSS uses an UL subcarrier mapping method. A physical sidelink synchronization channel (PSSCH) may be a channel for transmitting system information (e.g., information related to the SLSS, a duplex mode (DM), a TDD UL/DL configuration, information related to a resource pool, types of applications related to the SLSS, a subframe offset, broadcast information, or the like) which is basic information that the UE is required to identify first before transmitting/receiving a sidelink signal. The PSSCH may be transmitted over a subframe identical or subsequent to the SLSS. The DM-RS may be used for demodulation of the PSSCH.

The SRN may be a node for transmitting the SLSS, or the PSSCH. The SLSS may be in the form of a specific sequence, and the PSSCH may be a sequence representing specific information or in the form of a codeword after pre-defined channel coding has been performed. Here, a base station or a specific sidelink UE may be served as the SRN. A UE may be served as the SRN in the case of partial network coverage or out-of-network-coverage.

When needed, the SLSS may be relayed, for example, through multi-hop, for sidelink communication with an out-of-coverage UE. Relaying a synchronization signal in description below includes, as well as directly relaying a synchronization signal of a base station, transmitting a sidelink synchronization signal in a separate format at the time of receiving the synchronization signal. Like this, since the sidelink synchronization signal is relayed, direct communication between an in-coverage UE and an out-of-coverage UE may be performed.

<NR Sidelink>

As described above, unlike the V2X based on the LTE system, NR-based V2X technology is required to be developed for satisfying complex requirements as in autonomous driving.

In accordance with embodiments of the present disclosure, it is possible to provide a flexible V2X service in more diverse environments by applying a frame structure, numerology, a channel transmission/reception procedure, or the like of the NR to the NR V2X. To this end, it is necessary to develop technologies, such as, a resource sharing technology between a base station and a UE, a sidelink carrier aggregation technology (CA), a partial sensing technology for a UE held by a pedestrian, a short transmission time interval (sTTI), or the like.

In the NR V2X, it has been determined to support unicast or groupcast, as well as broadcast used in the LTE V2X. In this case, it also has been determined to use a target group ID for the unicast or the groupcast, and but it has been determined to discuss later whether to use a source ID.

Further, as it has been determined to support HARQ for QOS, it has been determined that a HARQ process ID is included in control information. In the LTE HARQ, a PUCCH for the HARQ is transmitted after 4 subframes after DL has been transmitted. In the NR HARQ, for feedback timing, a PUCCH resource and a feedback timing may be indicated using a PUCCH resource indicator in DCI format 1_0 or 1_1 PUCCH or a HARQ feedback timing indicator in response to the PDSCH (PDSCH-to-HARQ feedback timing indicator).

Figure 10:
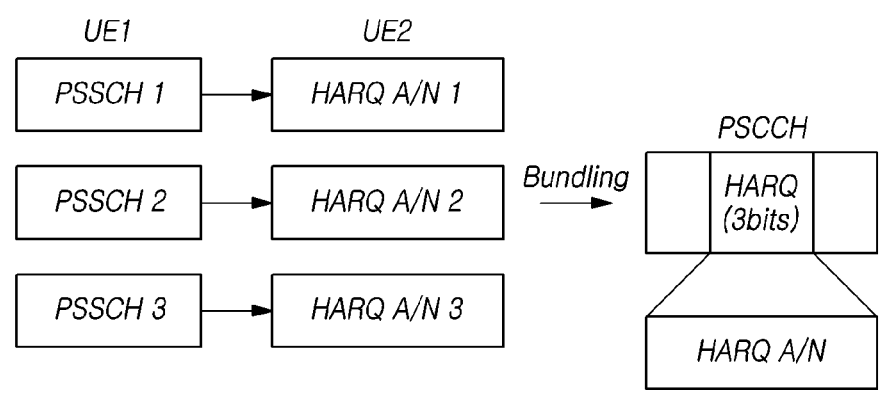
FIG. 10 illustrates a method of bundling and transmitting HARQ feedback information in the V2X.

FIG. 10 illustrates a method of bundling and transmitting HARQ feedback information in the V2X;

Referring to FIG. 10, in the LTE V2X, separate HARQ ACK/NACK information is not transmitted in order to reduce system overhead, and data are allowed to be retransmitted once according to discretion of a transmitting UE for data transmission safety. However, in the NR V2X, in terms of data transmission stability, HARQ ACK/NACK information may be transmitted. In this case, overhead may be reduced by bundling and transmitting the corresponding information.

That is, when a transmitting UE (UE1) transmits three data transmissions to a receiving UE (UE2), and then the receiving UE generates HARQ ACK/NACK information in response to the transmissions, this may be bundled and transmitted over a PSCCH. FIG. 10 illustrates that HARQ ACK/NACK is transmitted over the PSCCH. However, the HARQ ACK/NACK may be transmitted over a separate channel or another channel, and the bundled HARQ information may be configured with 3 bits or less.

In frequency range 1 (FR1) for a frequency range of 3 GHz or less, 15 kHz, 30 kHz, 60 kHz, and 120 kHz have been discussed as a candidate subcarrier spacing (SCS). In frequency range 2 (FR2) for a frequency range exceeding 3 GHz, 30 kHz, 60 kHz, 120 kHz, and 240 kHz have been discussed as a candidate subcarrier spacing (SCS). In the NR V2X, a minislot (e.g., 2/4/7 symbols) smaller than 14 symbols may be supported as a unit of minimum scheduling.

The DM-RS, the PT-RS, the CSI-RS, the SRS, and the AGC training signal have been discussed as a candidate of the RS.

The following four options have been discussed for multiplexing of a PSCCH and an associated PSSCH, as illustrated in FIG. 11. Option 2 is similar to the multiplexing of the PSCCH and the PSSCH in the LTE V2X.

Synchronization Mechanism

NR V2X sidelink synchronization may include one or more sidelink synchronization signals and the PSBCH, and a sidelink source may include a UE in addition to the GNSS, and/or the gNB.

Resource Assignment

At least two sidelink resource assignment modes, i.e. mode 3 and mode 4, may by defined for NR V2X sidelink communication. In mode 3, a base station schedules one or more sidelink resources used by a UE for sidelink transmission. In mode 4, a UE determines one or more resources within one or more sidelink resources configured by a base station or one or more pre-configured sidelink resources.

Mode 4 may cover the following resource assignment sub-modes. That is, UE may automatically select a sidelink resource for transmission, help to select a sidelink resource for other UE(s), be configured with grant configured for sidelink transmission, or schedule the sidelink transmission of other UE(s).

V2X resource pool (sensing and selection windows)

A V2X UE may transmit a message (or a channel) over a pre-defined (or signaled) resource pool. The resource pool may mean a set of one or more resources pre-defined for enabling the UE to perform the V2X operation (or in the UE capable of performing the V2X operation). In this case, the resource pool may be defined in terms of time-frequency. The V2X transmission resource pool may be defined as various types.

Figure 11A:
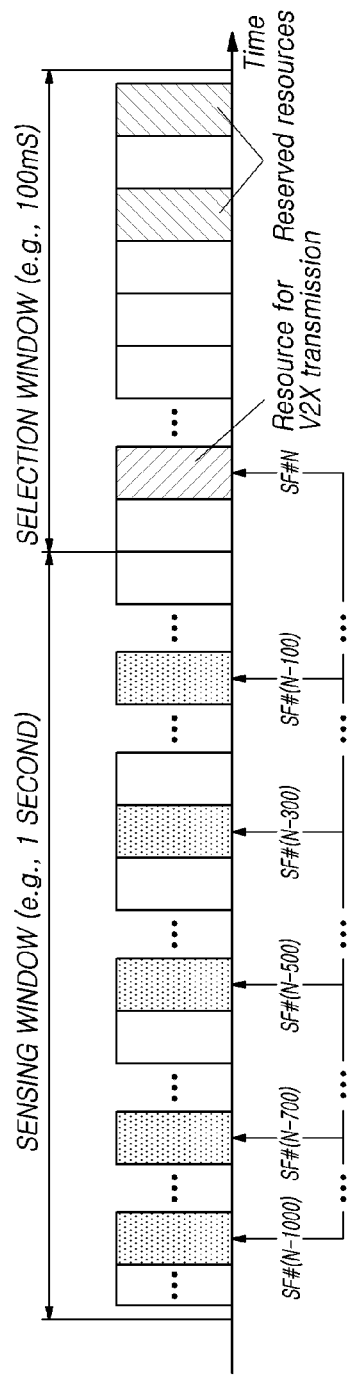
FIGS. 11A and 11B illustrate a type of a V2X transmission resource pool.
Figure 11B:
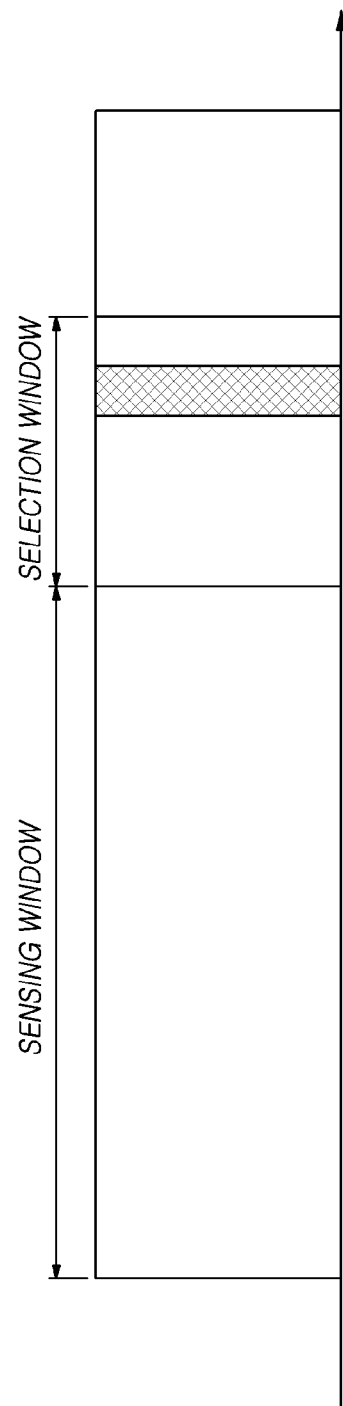

FIGS. 11A and 11B illustrate a type of a V2X transmission resource pool;

Referring to FIG. 11A, V2X transmission resource pool #A may be a resource pool over that allows partial sensing only. A V2X transmission resource selected by the partial sensing is remained semi-statically at a regular interval.

Referring to FIG. 11B, V2X transmission resource pool #A may be a resource pool allowing a random selection only. In V2X transmit resource pool #B, a UE does not perform partial sensing, and the UE may randomly select a V2X transmission resource in a selection window.

As one example, unlike a resource pool allowing partial sensing only, in a resource pool allowing the random selection only, a selected resource may be configured/signaled not to be semi-statically reserved. In order for a UE to perform a V2X message transmission operation over a V2X transmission resource pool, a base station may cause the UE not to perform a sensing operation (based on scheduling assignment decoding/energy measurement).

Although not illustrated in FIGS. 11A and 11B, a resource pool allowing both the partial sensing and the random selection may be used as well. A base station may notify a UE that a V2X resource may be selected by either of the partial sensing and the random selection.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR (New Radio)

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined. Thus the scheduling for the latency critical data, such as the URLLC, may be performed based on the mini-slot.

Figure 12:
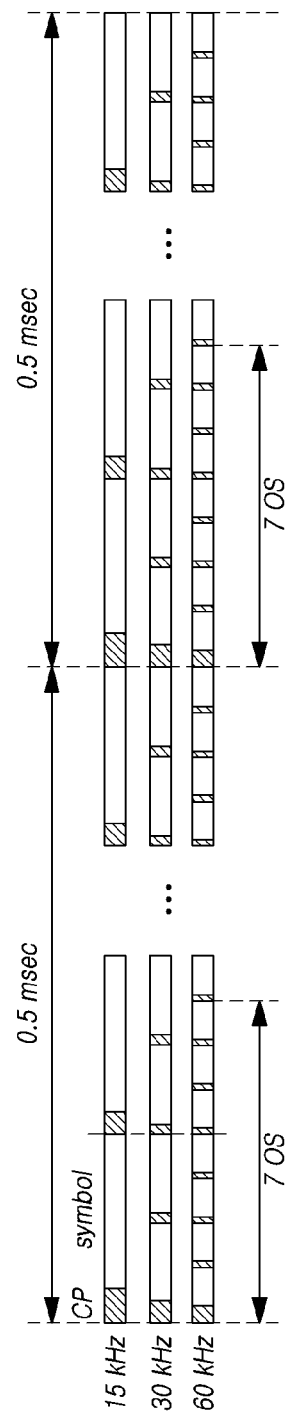
FIG. 12 illustrates an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 12, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

<Bandwidth Part, BWP>

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 13:
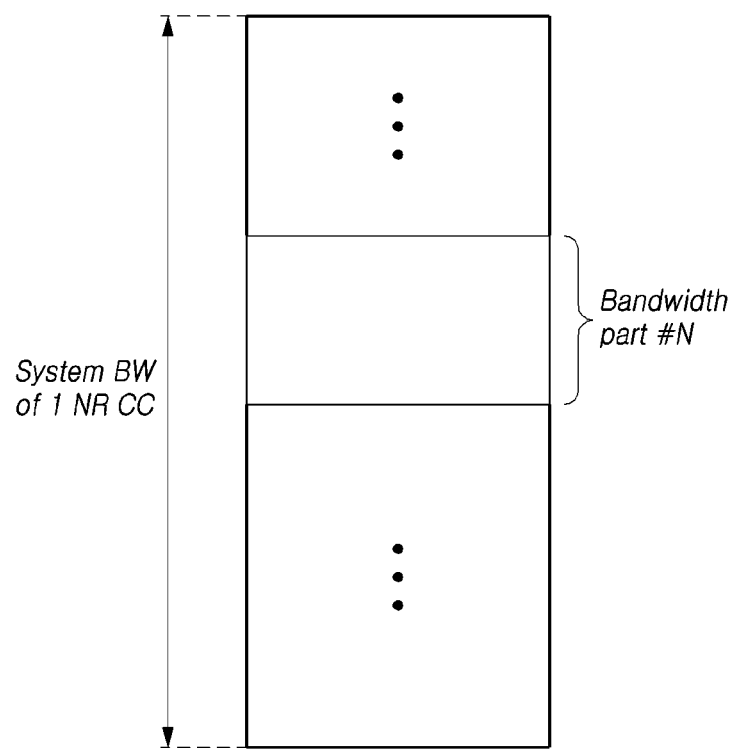
FIG. 13 schematically illustrates a bandwidth part in accordance with embodiments of the present disclosure.

However, the NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 13, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

A Method of Assigning a HARQ ACK/NACK Feedback Resource

According to a PUCCH resource assignment method for HARQ ACK/NACK feedback of a UE, which is defined in the NR, a base station configures a PUCCH resource set including one or more PUCCH resources for a UE and indicates (e.g., inform) PUCCH resource information to be used for HARQ ACK/NACK feedback in response to a PDSCH transmission using an ACK resource indicator (ARI) information area of the DCI. In this case, the PUCCH resource set is configured for each UL BWP configured for a corresponding UE, and separate PUCCH resource set(s) may be configured depending on a payload size of HARQ ACK/NACK for a UL BWP.

On the other hand, in the typical 3GPP LTE, the sidelink may support the V2X communication, which is a concept of fusion of, a device-to-device (D2D) communication, an vehicle-to-vehicle (V2V) communication, and a vehicle-to-base station (V2I: vehicle to infrastructure) communication. The transmission/reception method for the sidelink is standardized as an additional feature. In more details, the D2D is a service scenario that assumes communication between existing devices/terminals in a mutually equal relationship. V2V is an extended vehicle-to-vehicle communication service scenario that assumes a wireless communication environment between general pedestrians and vehicle terminals with different characteristics. In order to successfully utilize radio resources with or without the assistance of a base station, various technologies have been standardized in initial access and resource allocation.

In the NR, there are studies in progress for V2X related standardization for supporting the sidelink and satisfying changed service requirements, and the following four new service scenarios are introduced.

Vehicles Platooning enables vehicles to dynamically form platoons that move together. All vehicles included in a platoon acquire information from a leading vehicle to manage the platoon. This information enables vehicles i) to drive with more being adjacent to one another in a coordinated manner compared to a normal situation and ii) to move in the same direction together.

Extended Sensors enable raw or processed data collected via local sensors or live video images to be exchanged between vehicles, road site devices, pedestrian devices and V2X application servers. As a result, vehicles are able to raise environmental awareness beyond what their sensors can detect and have a broader and holistic view for a corresponding local situation. The high rate of data transmission is one of main features of this service scenario.

Advanced Driving enables semi-automatic or fully automatic driving. This service scenario enables each vehicle and/or road side unit (RSU) to share its own perception data obtained from local sensors with nearby vehicles and vehicles to synchronize and adjust trajectories or maneuvers. Each vehicle shares a driving intention with nearby driving vehicles.

Remote Driving enables a remote driver or a vehicle-to-everything (V2X) application to drive i) a vehicle in a hazardous environment or ii) a remote vehicle for passengers which cannot drive on its own. For example, driving based on cloud computing may be used when variations are limited and routes are predictable as in the public transportation. High reliability and low latency are main requirements of this scenario.

Meanwhile, in the NR V2X, an agreement has been tentatively reached on supporting Mode 1 in which a base station manages communication resources between UEs and Mode 2 in which communication resources are managed by communication between UEs. In particular, in Mode 2, an agreement has been reached on the following four transmission types, and respective types have been represented as Mode 2-(*a*)~Mode 2-(*d*) or Mode 2*a*~Mode 2*d*.

Mode-2*a*: A UE autonomously selects sidelink resource for transmission.

Mode-2*b*: The UE assists sidelink resource selection for other UE(s).

Mode-2*c*: The UE is configured with NR configured grant (type-1 like) for sidelink transmission.

Mode-2*d*: The UE schedules sidelink transmissions of other UEs.

However, an agreement has been reached that the Mode-2*b* for transmitting subsequent channel configuration assistant information is defined as additional functions of the other three modes, and therefore, it will not be operated any longer as a single mode.

In the case of the LTE, the mode is divided into Mode 1 and Mode 3 when the base station manages communication resources between the UEs, and the mode is divided into Mode 2 and Mode 4 when the UE autonomously manages communication resources.

The sidelink transmission procedure of LTE Mode 1 is described in below.

1) The base station configures a resource pool for transmission of the PSCCH to all UEs. The resource pool is divided into regions (1>4=4 RB in total) which are made up of two subframes and 1RB bandwidth as a unit, and an index of 6 bits is allocated to each region. At this time, the index is allocated only in the upper half band of the resource pool, and all sidelink UEs repeatedly transmit the same SCI at the same position in the lower half band (total 8 RB).

2) When the UE transmits a scheduling request (SR) through the PUCCH to the base station, the base station transmits the PSCCH index of 6 bits and time/frequency resource information of the data region through the PDCCH with DCI Format 5.

3) The UE transmits the message with SCI format 0 through the PSCCH resource indicated by the 6 bit based on the received information. At this time, the data region resource inside the message uses the information received with DCI Format 5. In addition, the UE transmits the data to be transmitted by mapping it to a corresponding data region resource after encoding it by using an MCS value selected by itself or configured by the RRC.

4) Other UEs continue to search inside the resource pool for the transmission of the PSCCH. When they detect the PSCCH transmitted by the user they want, they detect the data area resource location, the MCS and the like based on the corresponding SCI message and perform the sidelink reception.

The sidelink transmission procedure of LTE Mode 2 is described in below.

1) The base station configures the resource pool for transmission of the PSCCH in the Mode 2 to all UEs. The structure of this resource pool is the same as that in Mode 1.

2) The UE confirms whether a specific PSCCH resource region is used through sensing. Confirming that the specific PSCCH resource region is empty through the sensing, the UE transmits message with an SCI format 0 indicating the empty PSSCH resource region. At this time, the data region resource inside the message follows the resource area selected by itself. The UE encodes the data to be transmitted using the MCS value selected by itself, and then transmits the data by mapping it to a corresponding data region resource.

3) The procedure for other UEs to receive the corresponding region is the same as that in Mode 1.

The sidelink transmission procedure of LTE Mode 3 is described in below.

1) The base station configures the resource pool for transmission of the PSCCH to all UEs. At this time, the PSCCH may be configured to be adjacent to or independent on the PSSCH indicated by the PSCCH or. When the PSCCH may be configured to be r independent on the PSSCH, it is similar to LTE Mode 1. The resource pool is divided into regions which are made up of one subframe and two consecutive RB regions (2×2=4 RB in total), and an index of k bits is allocated to each region. Here, k is dependent on the bandwidth size of the configured resource pool. When the PSCCH and the PSSCH indicated by the PSCCH are configured to be adjacent, a band of the configured resource pool is frequency-divided into subchannels having a minimum RB unit size of at least 4, and the bottom two RBs of each subchannel are PSCCH transmission candidate regions (2×2=4 RB in total), and an index consisting of k bits is allocated to them. Here, k is dependent on the bandwidth of the configured resource pool, that is, the number of subchannels. In the case of the Mode 3, the SCI is not repeatedly transmitted.

2) When the UE transmits the scheduling request (SR) through the PUCCH to the base station, the base station transmits the k-bit PSCCH index and time/frequency resource information of the data region with DCI format 5 through the PDCCH.

3) The UE transmits the message with SCI format 1 through the PSCCH resource indicated by the k-bit based on the received information. At this time, the data region resource inside the message uses the information received with DCI Format 5. The data to be sent is mapped to the corresponding data region resource and then transmitted through it.

4) The subsequent procedure is the same as that in the Mode 1.

The sidelink transmission procedure in LTE Mode 4 is described in below.

Basically a resource pool type is the same as that in the Mode 3, and the transmission method is the same as that in the Mode 2. However, the SCI additionally includes i) a message that can reserve a resource by configuring a specific time resource and ii) a priority message that can manage QoS.

In the NR V2X, it has been requested to support the sidelink transmission/reception based on the unicast or the groupcast, as well as the above-mentioned broadcast.

When the sidelink transmission/reception method based on the unicast or the groupcast is defined as a form of NR-based V2X communication, it is necessary to define a method of applying HARQ to a corresponding sidelink radio channel. The HARQ ACK/NACK message for a specific message may be transmitted through the physical sidelink feedback channel (PSFCH). In this case, the last symbol(s) of the slot may be used as the location of the corresponding PSFCH. The PSFCH region may be defined for every slot such as every N slots where N is greater than 1. However, a specific indication method, a resource region other than the last symbol, and a method of transmitting a feedback message excluding the HARQ have not been discussed yet.

When the PSFCH is allocated to the last symbol(s) of a slot, the UE using the slot as data transmission must perform transmission except for a resource region used as the PSFCH. In the current procedure, the UE that may be aware of that the PSFCH transmission will be performed is either the UE that has performed the first transmission or the UE that has received the corresponding block. Therefore, when another UE wants to use the resource region, there may occur a resource collision problem between the PSSCH region and the PSFCH region.

In addition, in the case of the sidelink, the synchronization between the signal transmitted by each UE and the signal received by each other UE is different from the base station-UE transmission/reception signal. This causes a time error of received signals of different UEs to occur at the OFDM symbol level. Accordingly, multiplexed transmission/reception based on a digital orthogonal signal with a sequence used in typical communication may cause serious interference and seriously deteriorate reception performance.

Accordingly, the present disclosure provides a method for allowing other UE to be aware of a slot including the PSFCH region used by the UE in an NR sidelink transmission/reception environment. In particular, the present disclosure provides a method for operating the resource pool in which the PSFCH region is pre-configured and a method for dynamically transmitting corresponding information through DCI/SCI when performing scheduling-based resource configuration in such an environment.

In addition, the present disclosure provides a method for generating a signal transmitted/received through the PSFCH region in the NR sidelink transmission/reception environment. In particular, the present disclosure provides a method for generating a signal based on the Zadoff-Chu sequence for sending the feedback message. The present disclosure also provides a method for configuring a parameter for transmitting and receiving the corresponding signal.

Hereinafter, a method of transmitting sidelink HARQ feedback information will be described with reference to the companying drawings.

Herein, the term "receiving UE or transmitter UE" means a UE receiving a PSCCH and a PSSCH corresponding to the PSCCH based on sidelink communication. The term "transmitting UE or receiver UE" herein means a UE transmitting a PSCCH and a PSSCH corresponding to the PSCCH based on sidelink communication.

Embodiments herein will be basically described based on a scenario in which a receiving UE transmits HARQ ACK/NACK feedback information based on the sidelink to a transmitting UE. However, embodiments of the present disclosure may be substantially equally applied to a scenario in which a receiving UE transmits HARQ ACK/NACK feedback information to a base station without departing from the spirit and the scope of the present disclosure.

Figure 14:
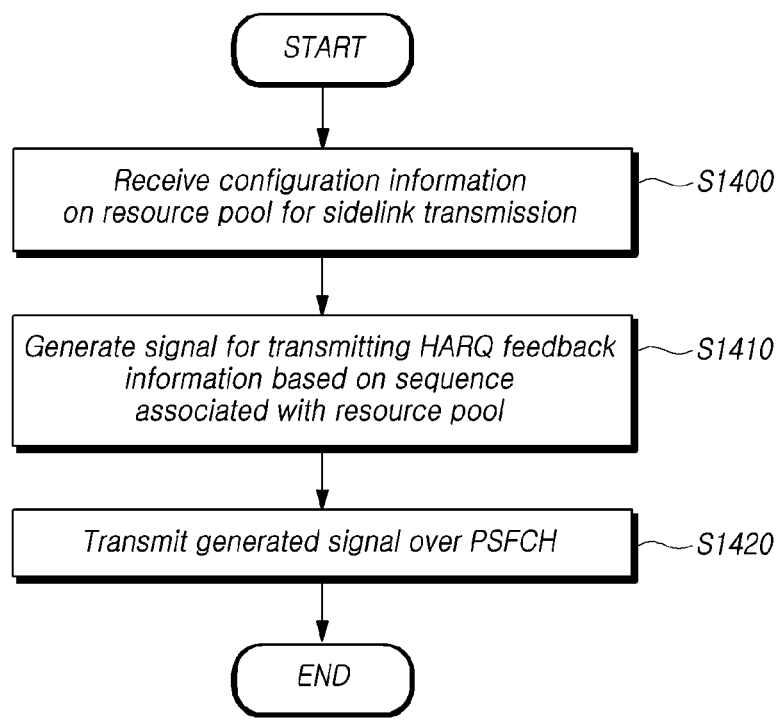
FIG. 14 is a flow diagram illustrating a procedure of an user equipment for transmitting HARQ feedback information for sidelink transmission in accordance with embodiments of the present disclosure.

FIG. 14 is a flow diagram illustrating a procedure of an user equipment for transmitting HARQ feedback information for sidelink transmission in accordance with embodiments of the present disclosure.

Referring to FIG. 14, the UE may receive configuration information on the resource pool for the sidelink transmission at step S1400.

The base station may configure the resource pool on the radio resources for the sidelink transmission and reception between the UE and other UEs. Here, the resource pool may be the radio resource configured to be used to transmit and receive PSCCH, PSSCH and the like between the UE and other UEs. The UE may receive the configuration information for the resource pool from the base station through higher layer signaling.

Hereinafter, the embodiments will be described on the premise of the Mode 2 where the base station configures the resource pool for the sidelink and manage the radio resources through communication between UEs. However, unless contrary to technical spirit, the embodiments will be substantially applied to the Mode 1 where the base station performs scheduling for the sidelink transmission.

Referring to FIG. 14 again, the UE generates a signal for transmitting the HARQ feedback information in response to the physical sidelink shared channel (PSSCH) received from other UE, based on a sequence associated with the resource pool at step S1410.

When receiving the PSSCH from the other UE, the UE may be configured to transmit the HARQ ACK/NACK feedback information in response to the received PSSCH to the other UE that transmitted the PSSCH. Accordingly, the UE may configure the HARQ ACK/NACK feedback information corresponding to the received PSSCH. As an example, whether to transmit the HARQ feedback information may be indicated by the sidelink control information (SCI) including the scheduling information for the PSSCH. That is, information indicating whether to transmit the HARQ feedback information may be transmitted together within the SCI including resource allocation information for the PSSCH transmission.

The UE may use a sequence associated with the resource pool for the sidelink transmission to generate the signal for transmitting the configured HARQ feedback information. In other words, the signal for transmission of the HARQ feedback information is generated by applying a cyclic shift to the sequence associated with the resource pool. As an example, the configuration information for the resource pool received from the base station may include information about the sequence pre-configured for the resource pool.

When generating the signal for transmitting the HARQ feedback information using the sequence associated with the resource pool, the UE may apply a predetermined cyclic shift value to minimize interference with each other. That is, applying the cyclic shift in the time domain applies linear phase rotation in the frequency domain, and signals generated through this may be orthogonal to each other to minimize the interference.

For example, when a large number of signals overlap, the noise of the sum of the interference signals increases so as to be not negligible, and in an environment where interference control is important, different cyclic shifts may be applied to the specific sequence for each UE so that the correlation property is substantially zero.

All UEs sharing the PSFCH resource have a common symbol length and sequence number value depending on a pre-configured value. In this case, as an example, a possible cyclic shift value may depend on the length of the sequence. For example, when the length of the sequence is 12, 12 kinds of cyclic shift values may be used. In addition, as an example, when the HARQ feedback information configured in each UE is one value of ACK and NACK, the cyclic shift values may be allocated according to this value.

As an example, the cyclic shift value may be applied to the sequence associated with the resource pool based on at least one of the identity (ID) of the UE, the ID of the other UE, and the value of HARQ feedback information in response to the PSSCH. For example, the ID of the receiving UE receiving the PSSCH may be indicated by the higher layer signaling. The ID of the other UE transmitting the PSSCH may be provided by the SCI including the scheduling information for the PSSCH. That is, in addition to the ID information of the UEs transmitting and receiving the PSSCH, a separate cyclic shift may be determined based on the case where the HARQ feedback information for the PSSCH reception at each UE is ACK and NACK, or only NACK.

Referring back to FIG. 14, the UE may transmit the generated signal over the physical sidelink feedback channel (PSFCH) within the resource pool at step S1420.

As an example, the PSFCH resource for transmitting the PSFCH may be indicated in the resource pool for the sidelink transmission configured between the UE and the other UE. In this case, the PSFCH region in addition to the PSCCH region and the PSSCH region may exist in the resource pool. In particular, the UE may receive the configuration information for frequency resources through which PSFCH can be transmitted in the resource pool.

As an example, the frequency resource for the PSFCH transmission may be configured as a set of physical resource blocks (PRBs) in the resource pool for the sidelink transmission. In this case, the configuration information on the frequency resource for the PSFCH transmission may be received by higher layer signaling.

In general, since the PSFCH is required to correspond to one transport block, it is not necessary to configure a transmission region for every RB. In the initial transmission, the UE may be configured to transmit the PSFCH only to a location corresponding to one PSCCH transmission region and perform transmission through the remaining slots including the corresponding region. In this case, the UE can perform transmission with the corresponding region keeping empty. The symbol length of the PSFCH is configured through the higher layer signaling such as RRC signaling other than the configuration information about the initial resource pool, and the resource allocation of the resource pool may be determined through this.

The UE may determine one or more PRB for the PSFCH used to transmit the HARQ feedback information among the set of PRBs according to the configuration information for the frequency resources in the resource pool, based on the number of subchannels for the resource pool and the number of PSSCH slots associated with the PSFCH slot. In addition, the UE may determine the number of PSFCH resources used to transmit the HARQ feedback information.

In addition, the transmission of the HARQ feedback information may be performed based on timing gap information between reception of the PSSCH and the transmission of the HARQ feedback information in response to the PSSCH reception. The timing gap may be received through the higher layer signaling. In this case, as an example, the transmission of the PSFCH may be performed in the first slot including the PSFCH resource in the resource pool after the last slot of the PSSCH reception.

Accordingly, the UE may transmit the signal generated for HARQ feedback information in response to the received PSSCH through the PSFCH resource determined from the resource pool.

According to the embodiments described above, it is possible to provide a specific method and apparatus for generating the signal transmitted through the PSFCH in order to transmit the HARQ feedback information for the sidelink transmission in the NR.

Figure 15:
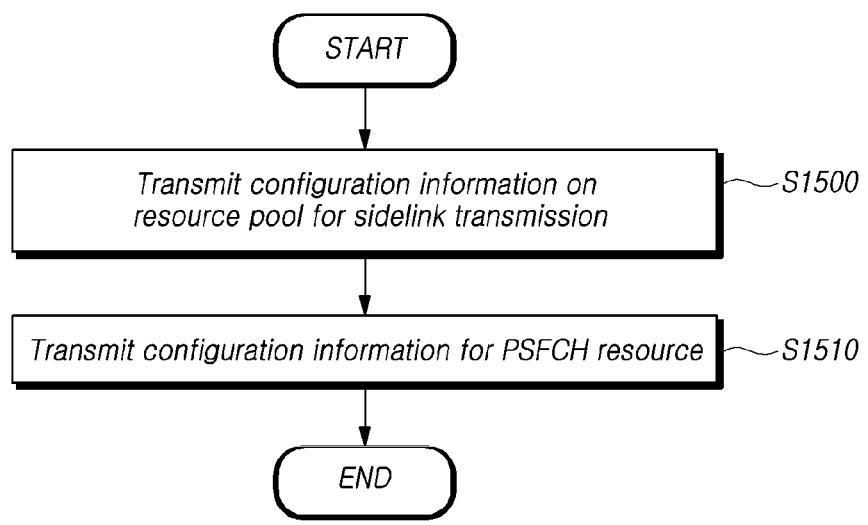
FIG. 15 is a flow diagram illustrating a procedure of a base station for controlling transmission of HARQ feedback information for sidelink transmission from an UE in accordance with one embodiment.

FIG. 15 is a flow diagram illustrating a procedure of the base station for controlling the transmission of the HARQ feedback information for the sidelink transmission from the UE in accordance with one embodiment.

Referring to FIG. 15, the base station may transmit the configuration information on the resource pool for the sidelink transmission at step S1500.

The base station may configure the resource pool on the radio resources for the sidelink transmission and reception between the UE and other UEs. Here, the resource pool may be the radio resource configured to be used to transmit and receive PSCCH, PSSCH and the like between the UE and other UEs. The UE may receive the configuration information for the resource pool from the base station through higher layer signaling.

Referring back to FIG. 15, the base station may transmit the configuration information for the PSFCH resource within the resource pool at step S1510.

As an example, the PSFCH resource for transmitting the PSFCH may be indicated in the resource pool for the sidelink transmission configured between the UE and the other UE. In this case, the PSFCH region in addition to the PSCCH region and the PSSCH region may exist in the resource pool. In particular, the UE may receive the configuration information for frequency resources through which PSFCH can be transmitted in the resource pool.

As an example, the frequency resource for the PSFCH transmission may be configured as a set of physical resource blocks (PRBs) in the resource pool for the sidelink transmission. In this case, the configuration information on the frequency resource for the PSFCH transmission may be received by higher layer signaling.

In general, since the PSFCH is required to correspond to one transport block, it is not necessary to configure a transmission region for every RB. In the initial transmission, the UE may be configured to transmit the PSFCH only to a location corresponding to one PSCCH transmission region and perform transmission through the remaining slots in which the corresponding region exists. In this case, the UE can perform transmission with the corresponding region keeping empty. The symbol length of the PSFCH is configured through the higher layer signaling such as RRC signaling other than the configuration information about the initial resource pool, and the resource allocation of the resource pool may be determined through this.

The UE may determine one or more PRB for the PSFCH used to transmit the HARQ feedback information among the set of PRBs according to the configuration information for the frequency resources in the resource pool, based on the number of subchannels for the resource pool and the number of PSSCH slots associated with the PSFCH slot. In addition, the UE may determine the number of PSFCH resources used to transmit the HARQ feedback information.

When receiving the PSSCH from the other UE, the UE may be configured to transmit the HARQ ACK/NACK feedback information in response to the received PSSCH to the other UE that transmitted the PSSCH. Accordingly, the UE may configure the HARQ ACK/NACK feedback information corresponding to the received PSSCH. As an example, whether to transmit the HARQ feedback information may be indicated by the sidelink control information (SCI) including the scheduling information for the PSSCH. That is, information indicating whether to transmit the HARQ feedback information may be transmitted together within the SCI including resource allocation information for the PSSCH transmission.

The UE may use a sequence associated with the resource pool for the sidelink transmission to generate the signal for transmitting the configured HARQ feedback information. In other words, the signal for transmission of the HARQ feedback information is generated by applying a cyclic shift to the sequence associated with the resource pool. As an example, the configuration information for the resource pool received from the base station may include information about the sequence pre-configured for the resource pool.

When generating the signal for transmitting the HARQ feedback information using the sequence associated with the resource pool, the UE may apply a predetermined cyclic shift value to minimize interference with each other. That is, applying the cyclic shift in the time domain applies linear phase rotation in the frequency domain, and signals generated through this may be orthogonal to each other to minimize the interference.

For example, when a large number of signals overlap, the noise of the sum of the interference signals increases so as to be not negligible, and in an environment where interference control is important, different cyclic shifts may be applied to the specific sequence for each UE so that the correlation property is substantially zero.

All UEs sharing the PSFCH resource have a common symbol length and sequence number value depending on a pre-configured value. In this case, as an example, a possible cyclic shift value may depend on the length of the sequence. For example, when the length of the sequence is 12, 12 kinds of cyclic shift values may be used. In addition, as an example, when the HARQ feedback information configured in each UE is one value of ACK and NACK, or only NACK, the cyclic shift values may be allocated according to this value.

As an example, the cyclic shift value may be applied to the sequence associated with the resource pool based on at least one of the identity (ID) of the UE, the ID of the other UE, and the value of HARQ feedback information in response to the PSSCH. For example, the ID of the receiving UE receiving the PSSCH may be indicated by the higher layer signaling. The ID of the other UE transmitting the PSSCH may be provided by the SCI including the scheduling information for the PSSCH. That is, in addition to the ID information of the UEs transmitting and receiving the PSSCH, a separate cyclic shift may be determined based on the case where the HARQ feedback information for the PSSCH reception at each UE is ACK and NACK.

In addition, the transmission of the HARQ feedback information may be performed based on timing gap information between reception of the PSSCH and the transmission of the HARQ feedback information in response to the PSSCH reception. The timing gap may be received through the higher layer signaling. In this case, as an example, the transmission of the PSFCH may be performed in the first slot including the PSFCH resource in the resource pool after the last slot of the PSSCH reception.

The base station may be configured to receive, through the physical uplink control channel (PUCCH) from the UE, the HARQ feedback information in response to a physical sidelink shared channel (PSSCH) received from other UE over a physical sidelink feedback channel (PSFCH) within the resource pool wherein the HARQ feedback information is generated based on a sequence associated with the resource pool.

In accordance with an embodiment, the method of the base station for controlling the transmission of the HARQ feedback information for the sidelink transmission from the UE may include; transmitting configuration information on a resource pool for the sidelink transmission, and receiving, through the physical uplink control channel (PUCCH) from the UE, the HARQ feedback information in response to a physical sidelink shared channel(PSSCH) received from other UE over a physical sidelink feedback channel (PSFCH) within the resource pool wherein the HARQ feedback information is generated based on a sequence associated with the resource pool.

According to the embodiments described above, it is possible to provide a specific method and apparatus for generating the signal transmitted through the PSFCH in order to transmit the HARQ feedback information for the sidelink transmission in the NR.

Hereinafter, there will be discussed a part or all of the embodiments which are related to a radio resource allocation and the generation of a signal for transmitting the HARQ feedback information for the sidelink in the NR, with reference to accompanying drawings.

The present disclosure provides (1) a method for generating the signal transmitted through the PSFCH, and (2) a method for configuring parameters for generating the PSFCH message.

Figure 16:
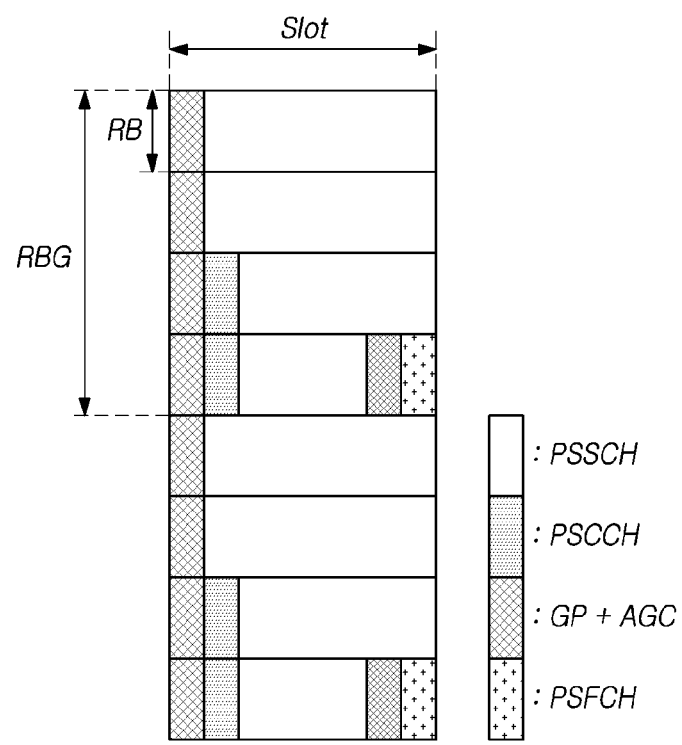
FIG. 16 illustrates an example of the PSFCH configured per the PSCCH configured in RBG units within a resource pool in accordance with one embodiment.

FIG. 16 illustrates a PSCCH-PSSCH-PSFCH multiplexing structure assumed in the present disclosure. FIG. 16 shows the slot including the PSFCH, and the PSFCH and GP+AGC associated with it may not be allocated in all slots. The resource block group (RBG) in FIG. 16 does mean not 12 resource blocks (RBs) in the typical NR but a minimum band that can be transmitted by one UE in the configured resource pool. For convenience of description and ease of understanding, FIG. 6 shows the bandwidth management structure inside the resource pool as an example. However, the embodiments of the present disclosure are not limited thereto.

First Embodiment: Signal Generation Via PSFCH

The present disclosure basically introduces how to use a Zadoff-Chu sequence to the PSFCH capable of improving a degree of interference due to low interference characteristics in a sidelobe even in an environment in which orthogonality is not guaranteed due to misalignment between incoming mixed signals.

As an example, the sequence used at this time may use a sequence $r_{u,v}^{(\alpha,\delta)}(n)$ defined as a sequence for a low-PAPR (peak to average power ratio) defined in TS 38.211. Here, $\alpha$ may be a value of a phase shift, $\delta$ may be a value of a cyclic shift, u may be a symbol length, and v may be a sequence number.

When using Zadoff-Chu sequence in the PSFCH, the following method may be applied. First, different values a of the phase shift between different UEs may be not supported. This is because the timing cannot be guaranteed and the signal should be classified only by the intensity value, not the phase value. In addition, an empty space for the guard band may be configured up and down. For example, even if two RBs are used, the signal is distributed only to REs smaller than 24. The GP (Guard period) may be introduced, but the AGC (automatic gain control) and RS (reference signal) are not introduced separately because of the possibility of additional interference. Specifically, the following methods may be additionally applied.

However, hereinafter, it is assumed on the premise that the Zadoff-Chu sequence is applied, but is not limited thereto. Embodiments described in the present disclosure may be applied substantially the same on other sequences other than the Zadoff-Chu sequence, unless contrary to technical spirit.

EXAMPLE ①

Use PSFCH with Extended CP (Cyclic Prefix)

In order to support the PSFCH transmission and reception maintaining the orthogonality in a situation in which an error of more than the existing CP occurs due to a large distance between UEs, the base station configures the number of symbols of the PSFCH to a value greater than 1 and the corresponding area to the CP. As an example, in an environment transmitted at 15 kHz subcarrier spacing (SCS), CP length c and symbol length u according to the number of the PSFCH symbols may be configured by the base station as follows.

(1) When s=1, c=144 Ts=9216 Tc, u=2048 Ts
(2) When s=2, c=2336 Ts (144+144+2048), u=2048 Ts
(3) When s=3, c=4528 Ts (144*3+2048*2), u=2048 Ts When the reception point (RP) uses the extended cyclic prefix (CP) at 60 kHz SCS, the CP length c and the symbol length u according to the number of PSFCH symbols s may be configured by the base station as follows.

(1) When s=1, c=128 Ts=8192 Tc, u=512 Ts
(2) When s=2, c=768 Ts (128+128+512), u=512 Ts In this case, since each signal is received in a form having only a phase error under the assumption that the time error between signals is within the CP range, the original orthogonality of the Zadoff-Chu sequence may be transmitted and received in an undamaged form.

EXAMPLE ②

Overlapping PSSCH and PSFCH

This embodiment does not designate a physically separated PSFCH and perform rate matching by matching the PSSCH to the designated PSFCH, but adjusts the transmission power of the symbol of the PSFCH to send a feedback control message at a pre-configured position in the PSSCH region. This embodiment is a method of allowing the PSSCH signal transmitted by any UE A and the PSFCH signal transmitted by UE B and the PSFCH signal transmitted by UE C to coexist on the same time/frequency resource.

However, the PSSCHs of different UEs may not coexist on the same time/frequency resource. In this case, the receiving UE receiving the PSSCH may treat and receive another signal transmitted through the PSFCH as interference noise, or the receiving UE may remove the component after attempting to detect the PSFCH. The transmitting UE may also perform an operation such as selecting a lower modulation coding scheme (MCS) level in advance by predicting the corresponding situation.

For this operation, the transmission power value of the PSFCH may be pre-configured separately. That is, the transmission power value of the PSFCH may be configured to a predetermined ratio or difference from the current PSSCH or PSCCH transmission power, or the transmission power value may be configured to an explicit value, and only the maximum or minimum value is configured and the UE may transmits it randomly.

Second Embodiment: Parameter Configuration for PSFCH Generation

In a typical code-based multiplexing environment, the Zadoff-Chu sequence is operated by using a sequence of different seeds between different UEs, so that the cross-correlation property is less than the square root of the length. That is, different u is used for each UE in the sequence $r_{u,v}^{(\alpha,\delta)}(n)$.

However, when a large number of signals overlap, the noise of the interference signal is increased to a level that cannot be neglected. In this environment where interference control is important, there may also be used a method of assigning to a cyclic shift of the specific sequence in which the correlation property is 0, that is, using different δ for each UE.

Figure 17:
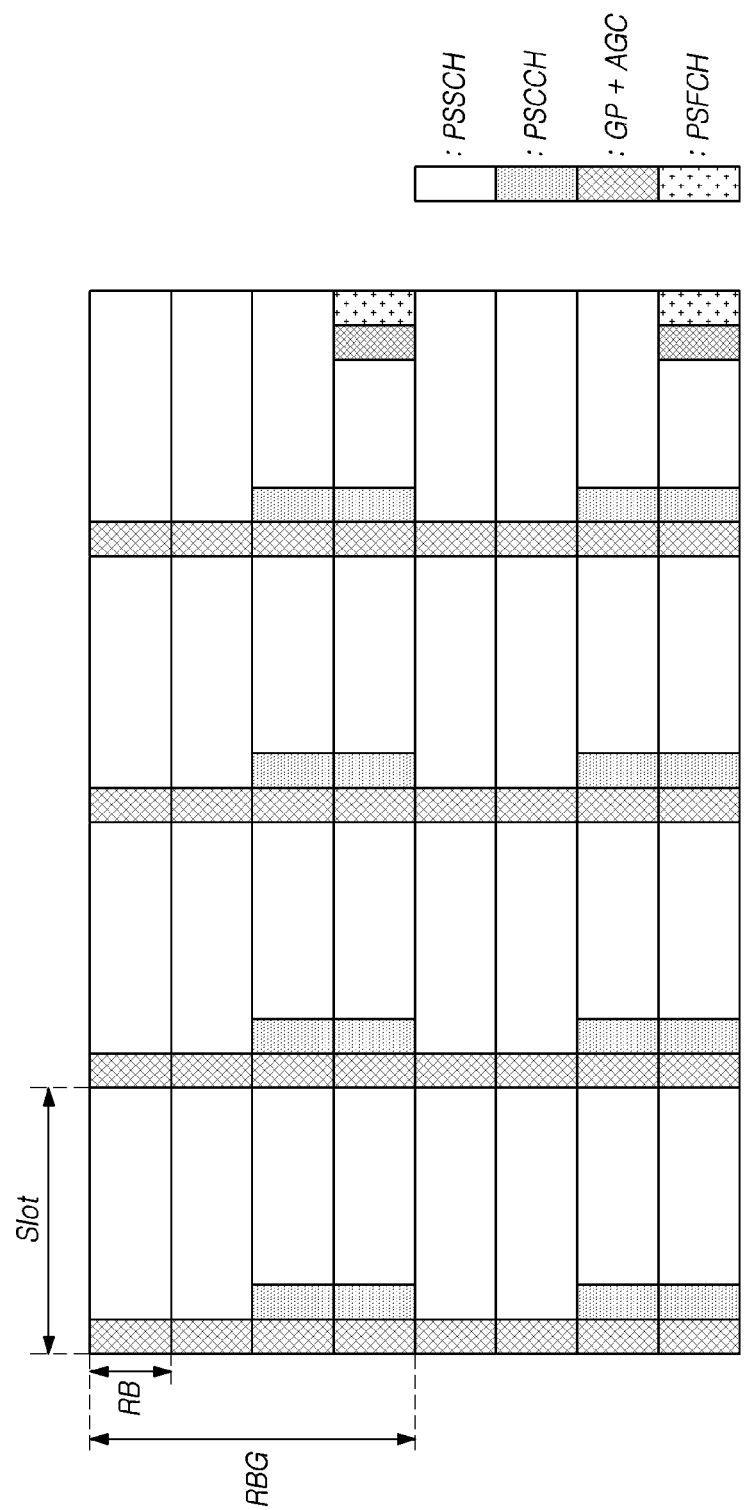
FIG. 17 illustrates an example of the PSFCH in which a period is defined as 4 in accordance with one embodiment.

In FIG. 17, the PSFCH structure defined as period 4 is described as an example, but a substantially identical scheme may be applied in all periods.

EXAMPLE ①

Use Only a Single Value of u, v

All UEs sharing the PSFCH resource have a common value of u and v depending on a preconfigured value. The possible cyclic shift value δ depends on the length of the sequence Nzc. For example, when Nzc is 12, 12 types of cyclic shift values may be used. In addition, ACK/NACK of each UE may be separately allocated according to the value.

The following allocations will be described as an example. Here, s is a value obtained by taking the number of the slot including the corresponding PSCCH as the remainder of the PSFCH period value, and p is the period of the slot including the PSFCH. In FIG. 17, p=4. k is a positive integer that is pre-configured to 1 or more or is dependent on p.

Method (1)
When it is ACK, δ=s mod $N_{ZC}$, and when it is NACK, $$\delta = s + \left\lfloor \frac{N_{ZC}}{2} \right\rfloor \bmod N_{ZC}$$

(or vice versa)
Method (2)
When it is ACK, δ=2s mod $N_{ZC}$ and when it is NACK, δ=2s+1 mod $N_{ZC}$ (or vice versa)
Method (3)
When it is ACK, $$\delta = \left\lfloor \frac{N_{ZC}}{p} \right\rfloor s \bmod N_{ZC}$$

and when it is NACK, $$\delta = \left\lfloor \frac{N_{ZC}}{p} \right\rfloor s + \left\lfloor \frac{N_{ZC}}{2p} \right\rfloor \bmod N_{ZC}$$

(or vice versa)
Method (4)
When it is ACK, δ=0 and when it is NACK, δ=ks+1 mod $N_{ZC}$ (or when it is ACK, δ=$N_{ZC}$−1 and when it is NACK, δ=ks mod $N_{ZC}$)

For example, assuming that Nzc=12, when the method (1) is applied, δ=6 for NACK of PSCCH-PSSCH transmitted through the 0th slot, and δ=3 for ACK of PSCCH-PSSCH transmitted through the 3rd slot. When the method (2) is applied, δ=1 for NACK of PSCCH-PSSCH transmitted through the 0th slot is, and is δ=6 for ACK of PSCCH-PSSCH transmitted through the 3rd slot. When the method (3) is applied, is δ=1 for NACK of PSCCH-PSSCH transmitted through the 0th slot, and δ=9 for ACK of PSCCH-PSSCH transmitted through the 3rd slot. In addition, when the method (4) is applied, δ=1 for NACK of PSCCH-PSSCH transmitted through the 0th slot, and δ=0 for ACK of PSCCH-PSSCH transmitted through the 3rd slot.

At this time, if two times of the period of the slot(p×2) in the methods (1), (2) and (3) is greater than Nzc, or if the period of slot plus one in the method (4) is greater than Nzc, it is possible to make some slots only support transmissions that cannot use HARQ.

EXAMPLE ②

Use Different Values of u, v Between UEs

The corresponding example ② is related to using different values of u and v between UEs according to the UE ID and the configured value.

When the PSFCH is mapped only to one RBG among a plurality of RBGs, the UEs using the PSCCH of the same time or the same frequency share the same u and v, and in each case the same δ between the UEs is allocated to the same frequency.

For example, in the case of FIG. 17, if the PSFCH is allocated to only one RBG, the PSFCH for the PSCCH transmitted through the upper RBG is defined as u=0, and the PSFCH for the PSCCH transmitted through the lower RBG is defined as u=1, the value of δ may be used as defined in the above example ①.

According to the above-mentioned embodiments, it is possible to provide methods and apparatuses for generating the signal transmitted the PSFCH for transmitting the HARQ feedback information for the sidelink transmission to a base station, in the NR. Therefore, the PSFCH transmission resource may be effectively operated, and the degree of deterioration of the feedback transmission performance of another UE may be reduced through the PSFCH transmission.

The present disclosure may further provide (1) a method of a resource pool operation in which the PSFCH region is separately defined, and (2) a method of transmitting information about the existence of the PSFCH region through the DCI or SCI region.

Hereinafter, the scheduling UE(S-UE) may mean a UE that manages the sidelink transmission resources between UEs, allocates transmission resources within a time/frequency resource configured by the base station or the like to each link based on information received from the SR or higher layer received from each UE, and performs a function of transmitting them to a transmitting UE of a corresponding link.

In addition, the scheduling indication message means a message that includes information on time/frequency location of a data region to be used by a transmitting UE and is transmitted by a base station or the scheduling UE in DCI/SCI format. In addition, the sidelink control message means a message that includes time/frequency and MCS information of a data region and the transmitting UE transmits to the receiving UE.

Third Embodiment: Resource Pool in Which PSFCH Region is Separately Defined

As one embodiment, the transmittable location of the PSFCH allocated to the last symbols may be predefined in the resource pool. The transmittable location of the PSFCH may be defined together when configuring the resource pool through the higher layer such as the RRC, but may be additionally configured in the resource pool previously designated through the dedicated RRC and may be separately defined according to need.

For example, the frequency location is defined when configuring the resource pool, and the number of symbols may be configured through additional information. Alternatively, a region may be additionally configured to be actually activated among the defined location regions used during initial setup, that is, a region to be used as an actual PSFCH among PSFCH configurable regions.

Specifically, the PSFCH transmittable region may be activated/deactivated in the resource pool previously designated through the RRC. The use of the PSFCH is unnecessary for a transport block transmitted for broadcast or the like, or when it is configured not to perform an HARQ procedure. Therefore, when the configuration for the transmission scheme is semi-statically changed in one resource pool, the PSFCH may be configured to exist only in a part corresponding to a specific time/frequency resource.

However, since this situation is likely to change over time, only the PSFCH candidate region is initially configured, and the PSFCH region to be activated/deactivated may be indicated through additional signaling such physical control signaling, MAC CE signaling, and RRC signaling. This region may be transmitted in the form of a PSFCH activation region or indirectly in the form of a transmission region supporting the HARQ.

Fourth Embodiment: Transmitting Information About the Existence of the PSFCH Region Through DCI and SCI Regions The PSFCH region configured and activated by the RRC is a region that may not be used for the PSSCH transmission by all UEs using the resource pool. When the number of pre-configured PSFCH regions is small, a sufficient amount of the PSFCH may not be utilized. If the number of pre-configured PSFCH regions is large, resources may be wasted.

In order to overcome such defects, a method of transmitting related information on a region for an actual PSFCH transmission to the UE using a corresponding slot may be considered. In this method, only a actually allocated region is excluded from the transmission resources. Such a method will be described in detail as follows.

When the scheduler indicates the transmission resource, it is possible to deliver information about the location of resource block (RB) and the number of symbol with the PSFCH. When indicating a slot for the corresponding transmission to the other UE as the sidelink transmission resource, based on information about the PSFCH resource to be used that the base station or the scheduling UE knows, this scheme enables a transmitting UE to configure a transport block excluding a corresponding resource by simultaneously transmitting related information on a region for the PSFCH transmission.

Alternatively, a group common control message may be used. The scheduler may groupcast which PSFCH is allocated/used in a specific sidelink resource pool to all UEs performing the sidelink transmission at every slot or every period in which the PSFCH is configured. Through this, the transmitting UE may configure the transmission region except the used PSFCH region based on the information obtained through the corresponding group common control message and the received scheduling indication message. In this case, the receiving UE may re-configure the transmission region to be received based on the SCI and the corresponding group common control message. The DCI/SCI format capable of delivering this may be defined, and the length of the corresponding message may depend on the number of PSFCHs in the resource pool.

In addition, the region indicated by the corresponding format may be the same as the slot that transmits the corresponding DCI, or the region indicated by the corresponding format may have a difference as much as the DCI-SCI gap+alpha in order to utilize the corresponding information for the transmitting part. The DCI-SCI gap means a slot distance between i) a control channel through which the scheduling UE transmits a DCI message or a scheduling indication message and ii) a PSCCH through which the transmitting UE transmits the SCI. The DCI-SCI gap be fixed to or be configured to UE-common. Alpha may have a value specified in the specification or may not be generally required.

Since the corresponding group common control message is a semi-persistent control message, it may be transmitted through a separately defined control resource set (CORESET) to reduce the probability of blind decoding (BD) of UEs.

The above-described first to fourth embodiments and respective examples may be applied independently of each other or may be applied in combination with each other, unless otherwise limited.

In accordance with the above-described embodiments, the PSFCH transmission resource may be effectively operated without deterioration of the sidelink transmission performance of other UEs through PSFCH transmission.

Hereinafter, the UE and the base station capable of performing a part or all of the embodiments described with reference to FIG. 1 to FIG. 17 will be discussed with reference to accompanying drawings.

Figure 18:
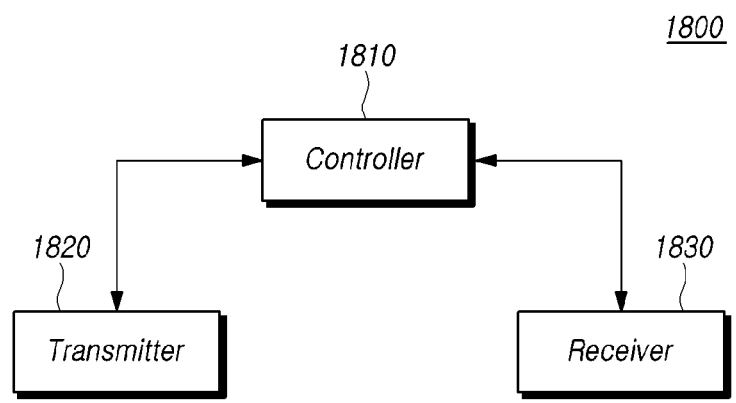
FIG. 18 is a block diagram illustrating a transmitting user equipment in accordance with embodiments of the present disclosure.

FIG. 18 is a block diagram illustrating a UE 1800 in accordance with embodiments of the present disclosure.

Referring to FIG. 18, the UE 1800 includes a controller 1810, a transmitter 1820, and a receiver 1830.

The controller 1810 controls overall operations of the UE 1800 according to methods for allowing the UE to transmit HARQ feedback information for sidelink transmission to a base station, needed to perform the embodiments of the present described above. The transmitter 1820 transmits UL control information, data, and messages etc. to the base station over a corresponding channel, and transmits sidelink control information, data, and messages etc. to a receiving UE over a corresponding channel. The receiver 1830 receives DL control information, data, and messages etc. from the base station over a corresponding channel, and receives sidelink control information, data, and messages etc. from the receiving UE over a corresponding channel.

The receiver 1830 may be configured to receive configuration information on a resource pool for the sidelink transmission. The base station may configure the resource pool on the radio resources for the sidelink transmission and reception between the UE and other UEs. Here, the resource pool may be the radio resource configured to be used to transmit and receive PSCCH, PSSCH and the like between the UE and other UEs. The UE may receive the configuration information for the resource pool from the base station through higher layer signaling.

The controller 1810 may be configured to generate a signal for transmission of the HARQ feedback information in response to a physical sidelink shared channel (PSSCH) received from other UE, based on a sequence associated with the resource pool. When the receiver 1830 receives the PSSCH from the other UE, the controller 1810 enables the transmitter 1820 to transmit the HARQ ACK/NACK feedback information in response to the received PSSCH to the other UE that transmitted the PSSCH. Accordingly, the controller 1810 may configure the HARQ ACK/NACK feedback information corresponding to the received PSSCH. As an example, whether to transmit the HARQ feedback information may be indicated by the sidelink control information (SCI) including the scheduling information for the PSSCH. That is, information indicating whether to transmit the HARQ feedback information may be transmitted together within the SCI including resource allocation information for the PSSCH transmission.

The controller 1810 may use a sequence associated with the resource pool for the sidelink transmission to generate the signal for transmitting the configured HARQ feedback information. In other words, the signal for transmission of the HARQ feedback information is generated by applying a cyclic shift to the sequence associated with the resource pool. As an example, the configuration information for the resource pool received from the base station may include information about the sequence pre-configured for the resource pool.

When generating the signal for transmitting the HARQ feedback information using the sequence associated with the resource pool, the controller 1810 may apply a predetermined cyclic shift value to minimize interference with each other. For example, when a large number of signals overlap, the noise of the sum of the interference signals increases so as to be not negligible, and in an environment where interference control is important, different cyclic shifts may be applied to the specific sequence for each UE so that the correlation property is substantially zero.

All UEs sharing the PSFCH resource have a common symbol length and sequence number value depending on a pre-configured value. In this case, as an example, a possible cyclic shift value may depend on the length of the sequence. For example, when the length of the sequence is 12, 12 kinds of cyclic shift values may be used. In addition, as an example, when the HARQ feedback information configured in each UE is one value of ACK and NACK, the cyclic shift values may be allocated according to this value.

As an example, the cyclic shift value may be applied to the sequence associated with the resource pool based on at least one of the identity (ID) of the UE, the ID of the other UE, and the value of HARQ feedback information in response to the PSSCH. For example, the ID of the receiving UE receiving the PSSCH may be indicated by the higher layer signaling. The ID of the other UE transmitting the PSSCH may be provided by the SCI including the scheduling information for the PSSCH. That is, in addition to the ID information of the UEs transmitting and receiving the PSSCH, a separate cyclic shift may be determined based on the case where the HARQ feedback information for the PSSCH reception at each UE is ACK and NACK, or only NACK.

The transmitter 1820 may be configured to transmit the generated signal over a physical sidelink feedback channel (PSFCH) within the resource pool. As an example, the PSFCH resource that can be used for transmitting the PSFCH may be indicated in the resource pool for the sidelink transmission configured between the UE and the other UE. The receiver 1830 may receive the configuration information about the frequency resource that transmits the PSFCH within the resource pool.

As an example, the frequency resource for the PSFCH transmission may be configured as a set of physical resource blocks (PRBs) in the resource pool for the sidelink transmission. In this case, the configuration information on the frequency resource for the PSFCH transmission may be received by higher layer signaling.

In general, since the PSFCH is required to correspond to one transport block, it is not necessary to configure a transmission region for every RB. In the initial transmission, the UE may be configured to transmit the PSFCH only to a location corresponding to one PSCCH transmission region and perform transmission through the remaining slots including the corresponding region exists. In this case, the UE can perform transmission with the corresponding region keeping empty. The symbol length of the PSFCH is configured through the higher layer signaling such as RRC signaling other than the configuration information about the initial resource pool, and the resource allocation of the resource pool may be determined through this.

The controller 1810 may determine one or more PRB for the PSFCH used to transmit the HARQ feedback information among the set of PRBs according to the configuration information for the frequency resources in the resource pool, based on the number of subchannels for the resource pool and the number of PSSCH slots associated with the PSFCH slot. In addition, the UE may determine the number of PSFCH resources used to transmit the HARQ feedback information.

In addition, the transmission of the HARQ feedback information may be performed based on timing gap information between reception of the PSSCH and the transmission of the HARQ feedback information in response to the PSSCH reception. The timing gap may be received through the higher layer signaling. In this case, as an example, the transmission of the PSFCH may be performed in the first slot including the PSFCH resource in the resource pool after the last slot of the PSSCH reception.

Accordingly, the transmitter 1820 may transmit the signal generated for HARQ feedback information in response to the received PSSCH through the PSFCH resource determined from the resource pool.

According to the above-mentioned UE, it is possible to generate the signal transmitted through the PSFCH in order to transmit the HARQ feedback information for the sidelink transmission in the NR.

Figure 19:
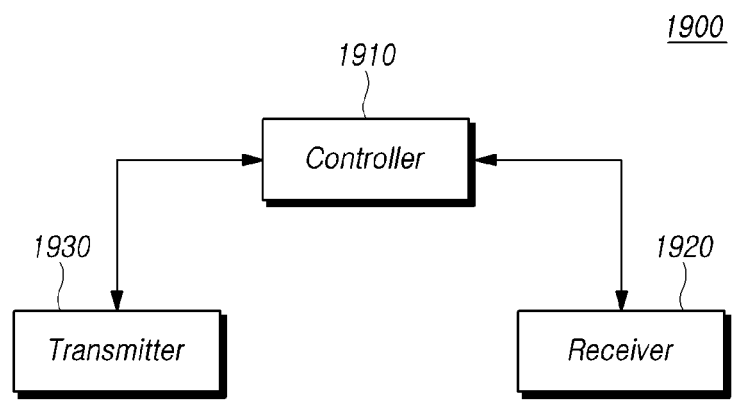
FIG. 19 is a block diagram illustrating a base station in accordance with embodiments of the present disclosure.

FIG. 19 is a block diagram illustrating a base station 1900 in accordance with embodiments of the present disclosure.

Referring to FIG. 19, the base station 1900 includes a controller 1910, a transmitter 1930, and a receiver 1920.

The controller 1910 controls overall operations of the base station 1900 according to methods for allowing the base station 1900 to receive HARQ feedback information for sidelink transmission from a transmitting UE, needed to perform the embodiments of the present described above. The transmitter 1930 is used to transmit signals, messages, and data needed for carrying out the embodiments described above to a UE. The receiver 1920 is used to receive signals, messages, and data needed for carrying out the embodiments described above from a UE.

The transmitter 1930 may transmit the configuration information about the resource pool on the radio resources for the sidelink transmission and reception between the UE and other UEs. The controller 1910 may configure the resource pool on the radio resources for the sidelink transmission and reception between the UE and other UEs. Here, the resource pool may be the radio resource configured to be used to transmit and receive PSCCH, PSSCH and the like between the UE and other UEs. The transmitter 1930 may transmit the configuration information for the resource pool to the UEs through higher layer signaling.

The transmitter 1930 may transmit the configuration information for the PSFCH resource within the resource pool. As an example, the PSFCH resource that can be used when transmitting the PSFCH may be indicated in the resource pool for the sidelink transmission configured between the UE and the other UE. In this case, the PSFCH region in addition to the PSCCH region and the PSSCH region may exist in the resource pool. In particular, the UE may receive the configuration information for frequency resources through which PSFCH can be transmitted in the resource pool.

As an example, the frequency resource for the PSFCH transmission may be configured as a set of physical resource blocks (PRBs) in the resource pool for the sidelink transmission. In this case, the configuration information on the frequency resource for the PSFCH transmission may be received by higher layer signaling.

In general, since the PSFCH is required to correspond to one transport block, it is not necessary to configure a transmission region for every RB. In the initial transmission, the UE may be configured to transmit the PSFCH only to a location corresponding to one PSCCH transmission region and perform transmission through the remaining slots including the corresponding region. In this case, the UE is able to perform transmission with the corresponding region keeping empty. The symbol length of the PSFCH is configured through the higher layer signaling such as RRC signaling other than the configuration information about the initial resource pool, and the resource allocation of the resource pool may be determined through this.

The UE may determine one or more PRB for the PSFCH used to transmit the HARQ feedback information among the set of PRBs according to the configuration information for the frequency resources in the resource pool, based on the number of subchannels for the resource pool and the number of PSSCH slots associated with the PSFCH slot. In addition, the UE may determine the number of PSFCH resources used to transmit the HARQ feedback information.

When receiving the PSSCH from the other UE, the UE may be configured to transmit the HARQ ACK/NACK feedback information in response to the received PSSCH to the other UE that transmitted the PSSCH. Accordingly, the UE may configure the HARQ ACK/NACK feedback information corresponding to the received PSSCH. As an example, whether to transmit the HARQ feedback information may be indicated by the sidelink control information (SCI) including the scheduling information for the PSSCH. That is, information indicating whether to transmit the HARQ feedback information may be transmitted together within the SCI including resource allocation information for the PSSCH transmission.

The UE may use a sequence associated with the resource pool for the sidelink transmission to generate the signal for transmitting the configured HARQ feedback information. In other words, the signal for transmission of the HARQ feedback information is generated by applying a cyclic shift to the sequence associated with the resource pool. As an example, the configuration information for the resource pool received from the base station may include information about the sequence pre-configured for the resource pool.

When generating the signal for transmitting the HARQ feedback information using the sequence associated with the resource pool, the UE may apply a predetermined cyclic shift value to minimize interference with each other. That is, applying the cyclic shift in the time domain applies linear phase rotation in the frequency domain, and signals generated through this may be orthogonal to each other to minimize the interference.

For example, when a large number of signals overlap, the noise of the sum of the interference signals increases so as to be not negligible, and in an environment where interference control is important, different cyclic shifts may be applied to the specific sequence for each UE so that the correlation property is substantially zero.

All UEs sharing the PSFCH resource have a common symbol length and sequence number value depending on a pre-configured value. In addition, as an example, when the HARQ feedback information configured in each UE is one value of ACK and NACK, or only NACK, the cyclic shift values may be allocated according to this value.

As an example, the cyclic shift value may be applied to the sequence associated with the resource pool based on at least one of the identity (ID) of the UE, the ID of the other UE, and the value of HARQ feedback information in response to the PSSCH. For example, the ID of the receiving UE receiving the PSSCH may be indicated by the higher layer signaling. The ID of the other UE transmitting the PSSCH may be provided by the SCI including the scheduling information for the PSSCH. That is, in addition to the ID information of the UEs transmitting and receiving the PSSCH, a separate cyclic shift may be determined based on the case where the HARQ feedback information for the PSSCH reception at each UE is ACK and NACK.

The UE may transmit the signal generated for HARQ feedback information in response to the received PSSCH through the PSFCH resource determined from the resource pool. In this case, the transmission of the HARQ feedback information may be performed based on timing gap information between reception of the PSSCH and the transmission of the HARQ feedback information in response to the PSSCH reception. The timing gap may be received through the higher layer signaling. As an example, the transmission of the PSFCH may be performed in the first slot including the PSFCH resource in the resource pool after the last slot of the PSSCH reception.

The receiver 1920 may be configured to receive, through the physical uplink control channel (PUCCH) from the UE, the HARQ feedback information in response to a physical sidelink shared channel(PSSCH) received from other UE over a physical sidelink feedback channel (PSFCH) within the resource pool wherein the signal is generated based on a sequence associated with the resource pool.

As other embodiment, the base station 1900 may the transmitter 1930 which is may be configured to transmit configuration information on a resource pool for the sidelink transmission, and the receiver 1920 which is may be configured to receive, through the physical uplink control channel (PUCCH) from the UE, the HARQ feedback information in response to a physical sidelink shared channel (PSSCH) received from other UE over a physical sidelink feedback channel (PSFCH) within the resource pool wherein the HARQ feedback information is generated based on a sequence associated with the resource pool.

According to this base station, it is possible to generate the signal transmitted through the PSFCH in order to transmit the HARQ feedback information for the sidelink transmission in the NR.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method of transmitting hybrid automatic repeat request (HARQ) feedback information for sidelink, performed by a receiving user equipment (UE), the method comprising:
   receiving, through a higher layer signaling, sidelink configuration information for a sidelink resource pool;
   receiving, through sidelink control information (SCI), scheduling information for a physical sidelink shared channel (PSSCH) and information indicating whether to transmit the HARQ feedback information;
   receiving, through the PSSCH, sidelink data from a transmitting UE; and
   transmitting, through a physical sidelink feedback channel (PSFCH), the HARQ feedback information using the sidelink resource pool,
   wherein the HARQ feedback information is transmitted based on the information indicating whether to transmit the HARQ feedback information, and
   wherein the HARQ feedback information is transmitted further based on
      i) a sequence associated with the sidelink resource pool and applied to a cyclic shift, and
      ii) information of a timing gap between a reception of the PSSCH and a transmission of the PSFCH, the timing gap information being received through the higher layer signaling,
   wherein the cyclic shift has a value based on
      an identity of the receiving UE that is indicated by the higher layer signaling,
      an identity of the transmitting UE that is included in the scheduling information of the SCI, the SCI provided to the receiving UE from the transmitting UE, and
      a value of the HARQ feedback, information that is transmitted in response to the PSSCH, and
   wherein, in determining the timing gap information, the reception of the PSSCH includes the receiving of the sidelink data from the transmitting UE and the transmission of the PSFCH is performed in response to the PSSCH reception.

2. The method according to claim 1,
   wherein the cyclic shift includes a separate cyclic shift that is based on a value of one of the ACK or the NACK or is based on a value of only the NACK.

3. The method according to claim 2, wherein the value of the HARQ feedback information is either an acknowledgement (ACK) or a negative acknowledgement (NACK).

4. The method according to claim 1, wherein the value of the cyclic shift is determined by a length of the sequence expressed as a number of symbols.

5. A receiving user equipment (UE) for transmitting hybrid automatic repeat request (HARQ) feedback information for sidelink, the receiving UE comprising:

a receiver configured
- to receive, through a higher layer signaling, sidelink configuration information for a sidelink resource pool,
- to receive, through sidelink control information (SCI), scheduling information for a physical sidelink shared channel (PSSCH) and information indicating whether to transmit the HARQ feedback information, and
- to receive, through the PSSCH, sidelink data from a transmitting UE; and a transmitter configured to transmit, through a physical sidelink feedback channel (PSFCH), the HARQ feedback information using the sidelink resource pool, wherein the HARQ feedback information is transmitted based on the information indicating whether to transmit the HARQ feedback information, and wherein the HARQ feedback information is transmitted further based on
- i) a sequence associated with the sidelink resource pool and applied to a cyclic shift, and
- ii) information of a timing gap between a reception of the PSSCH and a transmission of the PSFCH, the timing gap information being received through the higher layer signaling, wherein the cyclic shift has a value based on
- an identity of the receiving UE that is indicated by the higher layer signaling,
- an identity of the transmitting UE that is included in the scheduling information of the SCI, the SCI provided to the receiving UE from the transmitting UE, and
- a value of the HARQ feedback, information that is transmitted in response to the PSSCH, and wherein, in determining the timing gap information, the reception of the PSSCH includes the receiving of the sidelink data from the transmitting UE and the transmission of the PSFCH is performed in response to the PSSCH reception.

6. The receiving UE according to claim 5,
wherein the cyclic shift includes a separate cyclic shift that is based on a value of one of the ACK or the NACK or is based on a value of only the NACK.

7. The receiving UE according to claim 6, wherein the value of the HARQ feedback information is either an acknowledgement (ACK) or a negative acknowledgement (NACK).

8. The receiving UE according to claim 5, wherein the value of the cyclic shift is determined by a length of the sequence expressed as a number of symbols.

* * * * *